(12) United States Patent
Tomomasa et al.

(10) Patent No.: US 10,491,823 B2
(45) Date of Patent: Nov. 26, 2019

(54) MOBILE VEHICLE

(71) Applicant: Sharp Kabushiki Kaisha, Osaka (JP)

(72) Inventors: Masatoshi Tomomasa, Osaka (JP); Hisashi Kunihiro, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 244 days.

(21) Appl. No.: 15/258,340

(22) Filed: Sep. 7, 2016

(65) Prior Publication Data
US 2017/0094144 A1    Mar. 30, 2017

(30) Foreign Application Priority Data

Sep. 24, 2015    (JP) .................................. 2015-186865
Jun. 21, 2016    (JP) .................................. 2016-122738

(51) Int. Cl.
*B60L 5/00*    (2006.01)
*H04N 5/232*    (2006.01)
(Continued)

(52) U.S. Cl.
CPC ............ *H04N 5/2328* (2013.01); *B60L 15/20* (2013.01); *B60L 15/2036* (2013.01); *B60L 50/50* (2019.02);
(Continued)

(58) Field of Classification Search
CPC . B25J 18/025; B25J 5/007; B25J 5/005; B25J 11/009; H04N 7/185; H04N 5/2328; B60K 7/007
See application file for complete search history.

(56) References Cited

U.S. PATENT DOCUMENTS 5,350,033 A * 9/1994 Kraft .................... H04N 7/185
                                                    180/167
5,443,354 A * 8/1995 Stone ...................... B25J 5/005
                                                    414/729
(Continued)

FOREIGN PATENT DOCUMENTS

JP        2005-111595 A      4/2005

*Primary Examiner* — Hau V Phan
(74) *Attorney, Agent, or Firm* — Renner, Otto, Boisselle & Sklar, LLP

(57) ABSTRACT

The present invention aims to provide a mobile vehicle that can effectively suppress an image blur with a simple configuration.
The present invention provides a mobile vehicle comprising: an electric undercarriage that can travel; and an imaging unit provided on the electric undercarriage, wherein the electric undercarriage includes an undercarriage body, multiple wheels which are provided as a pair of left and right wheels on a front part of the undercarriage body and as a pair of left and right wheels on a rear part thereof, two electric motors that independently and rotationally drive the pair of left and right wheels on at least one of the front part and the rear part out of the multiple wheels, and a battery that supplies electric power to the two electric motors, the pair of left and right wheels rotationally driven by the electric motors being disposed on the same axle line, and in a plan view, the imaging unit is disposed in a circular region that is centered at a middle point on the axle line between the pair of left and right wheels rotationally driven by the electric motors and has a predetermined radius shorter than a distance between axle lines of the left and right wheels on the front and rear parts.

8 Claims, 17 Drawing Sheets

(51) Int. Cl.
  *B60L 15/20* (2006.01)
  *H04N 7/18* (2006.01)
  *B60L 50/60* (2019.01)
  *B60L 50/50* (2019.01)

(52) U.S. Cl.
  CPC .............. *B60L 50/66* (2019.02); *H04N 7/185* (2013.01); *B60L 2200/40* (2013.01); *B60L 2220/46* (2013.01); *Y02P 90/60* (2015.11); *Y02T 10/645* (2013.01); *Y02T 10/646* (2013.01); *Y02T 10/705* (2013.01); *Y02T 10/7005* (2013.01); *Y02T 10/7275* (2013.01)

(56) References Cited

U.S. PATENT DOCUMENTS

| | | | |
|---|---|---|---|
| 6,113,343 A * | 9/2000 | Goldenberg | B25J 5/005 239/587.2 |
| 7,464,775 B2 * | 12/2008 | Clemens | B60K 7/0007 180/8.1 |
| 7,967,870 B2 * | 6/2011 | Ko | B25J 18/025 180/167 |
| 8,677,876 B2 * | 3/2014 | Diaz | F41H 7/005 102/402 |
| 8,839,891 B2 * | 9/2014 | Kaloust | B62D 1/283 180/6.2 |
| 2005/0192721 A1 * | 9/2005 | Jouppi | G05D 1/0011 701/24 |
| 2007/0100498 A1 * | 5/2007 | Matsumoto | G05D 1/024 700/245 |
| 2007/0192910 A1 * | 8/2007 | Vu | B25J 5/007 700/245 |
| 2008/0105481 A1 * | 5/2008 | Hutcheson | B25J 5/007 180/209 |
| 2009/0164045 A1 * | 6/2009 | Deguire | G05D 1/0038 700/259 |
| 2011/0288682 A1 * | 11/2011 | Pinter | B25J 9/1689 700/259 |
| 2012/0182392 A1 * | 7/2012 | Kearns | B25J 11/009 348/46 |

* cited by examiner

MOBILE VEHICLE

CROSS-REFERENCE TO RELATED APPLICATIONS

This application is related to Japanese Patent Application Nos. 2015-186865 filed on 24 Sep. 2015 and 2016-122738 filed on 21 Jun. 2016, whose priorities are claimed under 35 USC § 119, and the disclosures of which are incorporated by reference in their entirety.

BACKGROUND OF THE INVENTION

1. Field of the Invention

The present invention relates to a mobile vehicle, and more particularly to a mobile vehicle including an imaging unit that photographs a surveillance target.

2. Description of the Background Art

Recently, a mobile vehicle that autonomously moves, such as a transfer robot that transfers cargo or a surveillance robot that surveils a condition in a building, around a building, or in a predetermined site, has been used. In addition, an autonomous vehicle provided with a camera, various sensors, an arm, a boom, and the like may sometimes be used for searching sufferers in disaster areas struck by an earthquake, tsunami, a landslide, or the like or for activities of collecting information concerning the inside of a factory or a power plant where an accident has occurred in a dangerous area (for example, see Japanese Unexamined Patent Publication No. 2005-111595).

The conventional autonomous vehicle described above preliminarily stores map information and moving route information where the vehicle should travel, and travels on a predetermined route, while avoiding an obstacle, by utilizing information acquired from a camera, a distance image sensor, and a GPS (Global Positioning System). An autonomous vehicle provided with a camera may not recognize an image because of a large image blur caused by vibration during a turn. In view of this, the autonomous vehicle includes a vibration absorption member at a camera mounting position for suppressing an image blur.

However, when an image blur suppression structure that is effective for all vibrations from large vibration to small vibration is applied, the structure becomes complex and takes much cost.

Particularly in an autonomous vehicle having a boom that lifts and lowers a camera, the boom shakes during a turn of the autonomous vehicle, so that an image blur increases.

SUMMARY OF THE INVENTION

The present invention is accomplished in view of the above problem, and an object of the present invention is to provide a mobile vehicle that can effectively suppress an image blur with a simple configuration.

The present invention provides a mobile vehicle comprising:

an electric undercarriage that can travel; and an imaging unit provided on the electric undercarriage, wherein the electric undercarriage includes an undercarriage body, multiple wheels which are provided as a pair of left and right wheels on a front part of the undercarriage body and as a pair of left and right wheels on a rear part thereof, two electric motors that independently and rotationally drive the pair of left and right wheels on at least one of the front part and the rear part out of the multiple wheels, and a battery that supplies electric power to the two electric motors, the pair of left and right wheels rotationally driven by the electric motors being disposed on the same axle line, and in a plan view, the imaging unit is disposed in a circular region that is centered at a middle point on the axle line between the pair of left and right wheels rotationally driven by the electric motors and has a predetermined radius shorter than a distance between axle lines of the left and right wheels on the front and rear parts.

The mobile vehicle according to the present invention can move forward, move backward, turn counterclockwise, turn clockwise, and turn while stationary by independently controlling the rotation of a pair of left and right wheels on at least one of a front part and a rear part out of multiple wheels. When the vehicle turns, the vehicle turns counterclockwise or clockwise due to the difference in the rotating speed between the left and right wheels that are rotationally driven, or turns while stationary by rotating the left and right wheels in the opposite directions.

It is supposed in this case that the left and right front wheels are drive wheels to which rotation force is transmitted, and the left and right rear wheels are driven wheels to which rotation force is not transmitted, for example. When the vehicle turns counterclockwise, the left rear wheel moves with a radius of curvature larger than a radius of curvature of the left front wheel, and when the vehicle turns clockwise, the right rear wheel moves with a radius of curvature larger than a radius of curvature of the right front wheel, if the vehicle does not have a steering mechanism.

Therefore, with the configuration in which, in a plan view, the imaging unit is disposed in a circular region that is centered at a middle point on the same axle line between the left and right wheels, which are on at least one of the front part and the rear part and rotationally driven by the electric motors, and has a predetermined radius shorter than a distance between axle lines of the front wheels and rear wheels, the imaging unit can turn with a small radius of curvature while the vehicle turns, compared to the case where the imaging unit is disposed in the vicinity of the middle point on the same axle line between the left and right wheels which are on the other of the front part or the rear part and not rotationally driven.

Consequently, a turning speed and shake of the imaging unit while the vehicle turns can be suppressed, whereby an image blur can be suppressed with a simple configuration without using a vibration absorption member, a vibration absorption mechanism, or the like which is specially provided. In addition, the imaging unit does not protrude outward from the electric undercarriage in the horizontal direction, which prevents the imaging unit from colliding against an obstacle while the mobile vehicle travels.

DESCRIPTION OF THE PREFERRED EMBODIMENTS

Figure 1A:
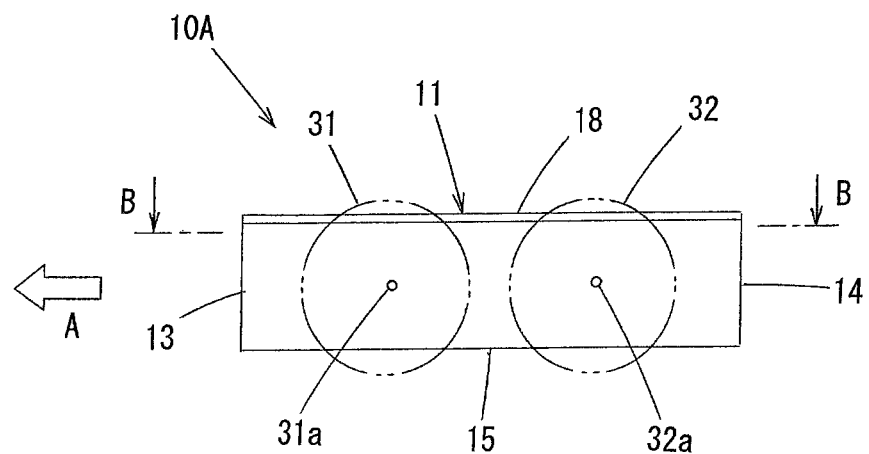
FIG. 1 is a diagram for describing a schematic configuration of an electric undercarriage of a mobile vehicle according to a first embodiment of the present invention, wherein (A) is a left side view, and (B) is a sectional view viewed from an arrow along a line B-B in (A)

A mobile vehicle according to the present invention comprises:

an electric undercarriage that can travel; and an imaging unit provided on the electric undercarriage, wherein the electric undercarriage includes an undercarriage body, multiple wheels which are provided as a pair of left and right wheels on a front part of the undercarriage body and as a pair of left and right wheels on a rear part thereof, two electric motors that independently and rotationally drive the pair of left and right wheels on at least one of the front part and the rear part out of the multiple wheels, and a battery that supplies electric power to the two electric motors, the pair of left and right wheels rotationally driven by the electric motors being disposed on the same axle line, and in a plan view, the imaging unit is disposed in a circular region that is centered at a middle point on the axle line between the pair of left and right wheels rotationally driven by the electric motors and has a predetermined radius shorter than a distance between axle lines of the left and right wheels on the front and rear parts.

In this case, the wheels include a wheel with tire, an omni wheel, a Mecanum wheel, and the like.

The mobile vehicle according to the present invention may be configured as described below, and these configurations may be combined as appropriate.

(1) The predetermined radius may be set to be equal to or shorter than a distance from the middle point to an outer peripheral edge of the electric undercarriage in a plan view.

With this configuration, the imaging unit does not protrude outward from the electric undercarriage in the horizontal direction, which prevents collision against an obstacle while the mobile vehicle travels.

(2) The imaging unit may be disposed in a rectangular region which falls within the circular region and is formed such that corner portions are located on the axle line and on a longitudinal centerline that passes through the middle point and is orthogonal to the axle line.

In other words, the rectangular region falling within the circular region may be a square region having four sides which cross the centers of contact areas of the left and right front wheels, which are rotationally driven, and a longitudinal centerline, which passes through the middle point and is orthogonal to the axle line, at an angle of 45 degrees.

According to this configuration, when a lift mechanism for lifting and lowering the imaging unit is provided on the electric undercarriage, the lifted imaging unit is disposed within the rectangular region, whereby an image can stably be acquired even from the position of the lifted imaging unit.

(3) A stationary turn center point of the electric undercarriage may coincide with the middle point on the axle line between the left and right wheels which are rotationally driven by the electric motors.

According to this configuration, the center of the circular or rectangular region where the imaging unit is disposed coincides with the stationary turn center point. Therefore, the radius of curvature of the turn of the imaging unit during the stationary turn of the mobile vehicle can further be suppressed. Thus, an image blur of the imaging unit during the stationary turn can further be suppressed, which is particularly effective for photographing from the position of the imaging unit which is lifted up by a lifting mechanism unit provided on the electric undercarriage for lifting and lowering the imaging unit.

(4) The electric undercarriage may further include a right power transmission mechanism for connecting the front and rear wheels on the right and a left power transmission mechanism for connecting the front and rear wheels on the left, wherein a stationary turn center point of the electric undercarriage may be a center point of a rectangular area enclosed by center points of contact areas of the left and right front wheels and the left and right rear wheels.

According to this configuration, the center or the vicinity of the center of the electric undercarriage can be defined as the stationary turn center point, the stationary turn center point can be placed in the circular or rectangular region, and the imaging unit can be disposed on the stationary turn center point or the vicinity thereof. This configuration is suitable for a mobile vehicle that photographs with less image blur by lifting and lowering the imaging unit at the center or the vicinity of the center of the electric undercarriage.

(5) The left and right wheels rotationally driven by the electric motors may be front wheels, and each of the left and right rear wheels may be a wheel with roller including a wheel body and a plurality of rollers mounted on the outer periphery of the wheel body.

The wheel with roller includes an omni wheel (registered trademark) in which the angle of the rotation axis of each roller is 90 degrees with respect to an axle line of the wheel body, and a Mecanum wheel in which the angle of the rotation axis of each roller is 45 degrees with respect to an axle line of the wheel body.

According to this configuration, the rear wheels can smoothly be moved during a stationary turn of the mobile vehicle having the configurations of (2) and (3), whereby an image blur can further be suppressed.

(6) The imaging unit may be disposed on a longitudinal centerline that passes through the middle point and is orthogonal to the axle line in a plan view.

According to this configuration, an equivalent image blur suppressing effect can be obtained during a counterclockwise turn and a clockwise turn including a stationary turn of the mobile vehicle.

(7) The left and right wheels rotationally driven by the electric motors may be front wheels, and the imaging unit may be disposed anterior to the middle point on the axle line of the pair of left and right wheels on the front part.

According to this configuration, the imaging unit can be disposed at the center position at the front from which a surrounding condition is easy to be surveilled.

(8) The mobile vehicle may further comprise a lift mechanism unit that is provided on the electric undercarriage to lift and lower the imaging unit, wherein a movement range of the imaging unit lifted and lowered by the lift mechanism unit in a plan view may fall within the circular region.

According to this configuration, an image blur can be suppressed even when the electric undercarriage turns with the state in which the imaging unit is lifted to enable surveillance of a distant location.

(9) The lift mechanism unit may be configured to move the imaging unit in the vertical direction and in the front-back direction with respect to the electric undercarriage.

In this case, a parallel link mechanism having a boom that swings in the vertical direction and in the front-back direction or various pantograph mechanisms can be used as the lift mechanism unit.

(10) The lift mechanism unit may be configured to be capable of moving the imaging unit across the axle line in a plan view.

This configuration is suitable for a mobile vehicle in which a middle point of an axle line is defined as a stationary turn center point, and a lift mechanism unit moves an imaging unit forward when lowering the imaging unit, and moves the imaging unit rearward when lifting the imaging unit. Since the imaging unit is disposed in the vicinity of the stationary turn center point even when the imaging unit is lifted, an image blur during the stationary turn can be suppressed, whereby a stable image can be acquired.

(11) The lift mechanism unit may be a link mechanism including an underframe fixed on the undercarriage body to extend in the front-back direction, and a boom provided at a rear end of the underframe so as to be swingable around a lateral axis, the underframe may have a support unit that is provided on a front end of the underframe to support the boom, and the support unit may be disposed on the axle line of the left and right wheels rotationally driven by the electric motors.

According to this configuration, shake of the imaging unit in the descending state during the stationary turn can be suppressed, and the imaging unit can stably be supported.

(12) The lift mechanism unit may be configured to move the imaging unit only in the vertical direction with respect to the electric undercarriage.

According to this configuration, a diamond-shaped or crossed arm pantograph mechanism can be used for the lift mechanism unit.

(13) Each of the pair of left and right wheels rotationally driven by the electric motors may include a wheel body mounted to the electric undercarriage through a drive shaft and a tire mounted on an outer periphery of the wheel body and filled with air.

According to this configuration, vibration can be absorbed by the tires of the left and right drive wheels while the mobile vehicle travels, whereby an image blur of the imaging unit located close to the left and right drive wheels can be suppressed.

(14) The mobile vehicle may be an autonomous mobile vehicle.

According to this configuration, the mobile vehicle can be remotely operated by an operator in a wired or wireless manner, or the mobile vehicle can autonomously travel and surveil without having an operator on board.

Embodiments of a mobile vehicle according to the present invention will be described below in detail with reference to the drawings. In the embodiments described below, an autonomous mobile vehicle is described as one example. However, the mobile vehicle according to the present invention is not limited to an autonomous vehicle, and is applicable to a wired or wireless remotely-operated mobile vehicle or a manned mobile vehicle.

(First Embodiment)

Figure 2:
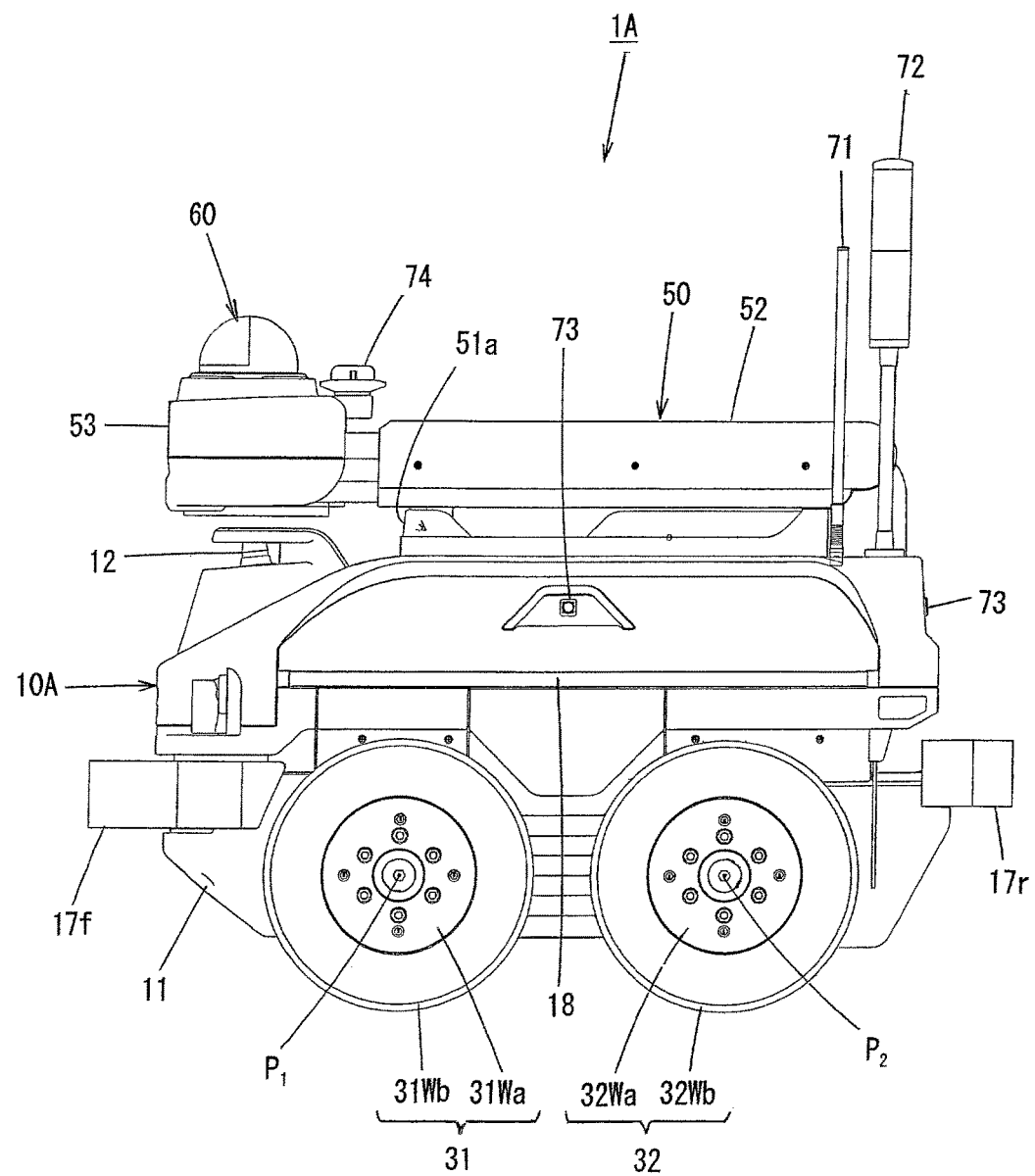
FIG. 2 is a left side view illustrating the mobile vehicle according to the first embodiment.
Figure 3:
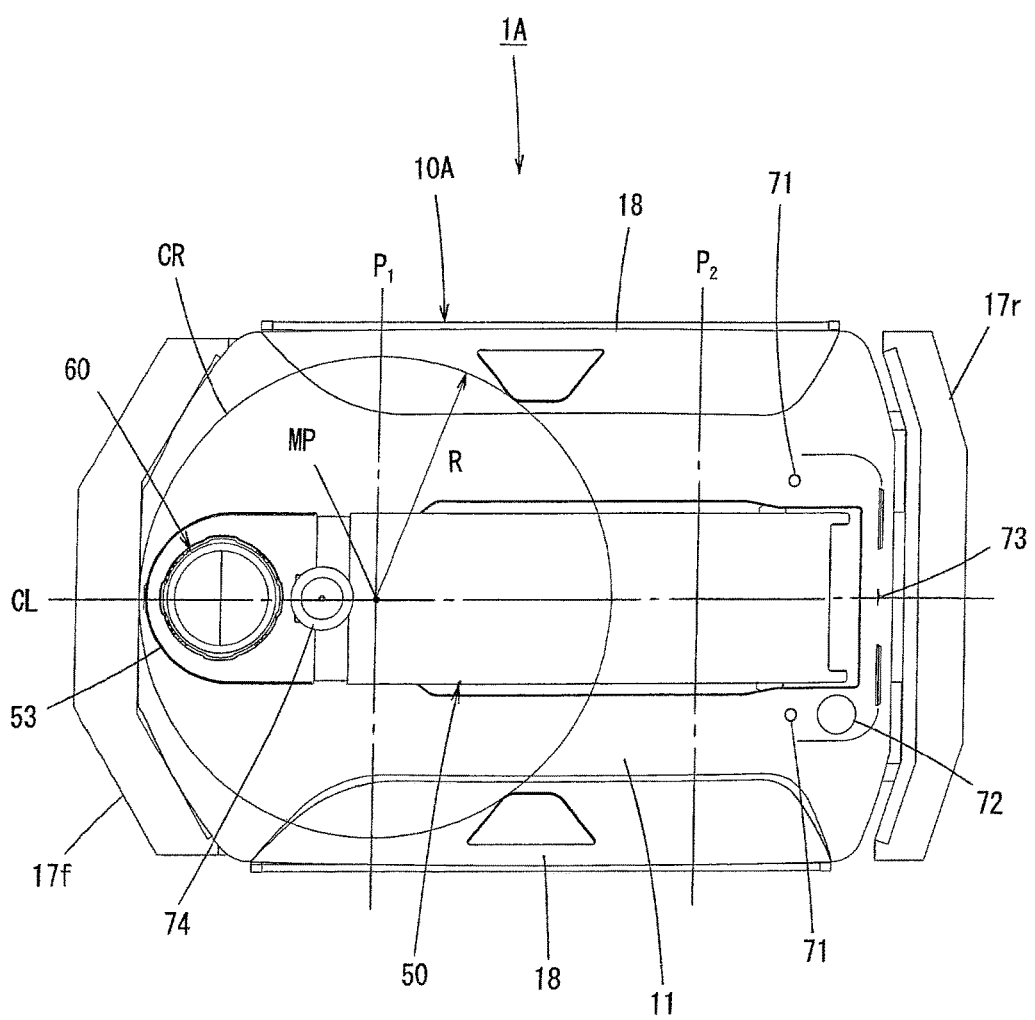
FIG. 3 is a plan view of the mobile vehicle illustrated in FIG. 2 viewed from top.
Figure 4:
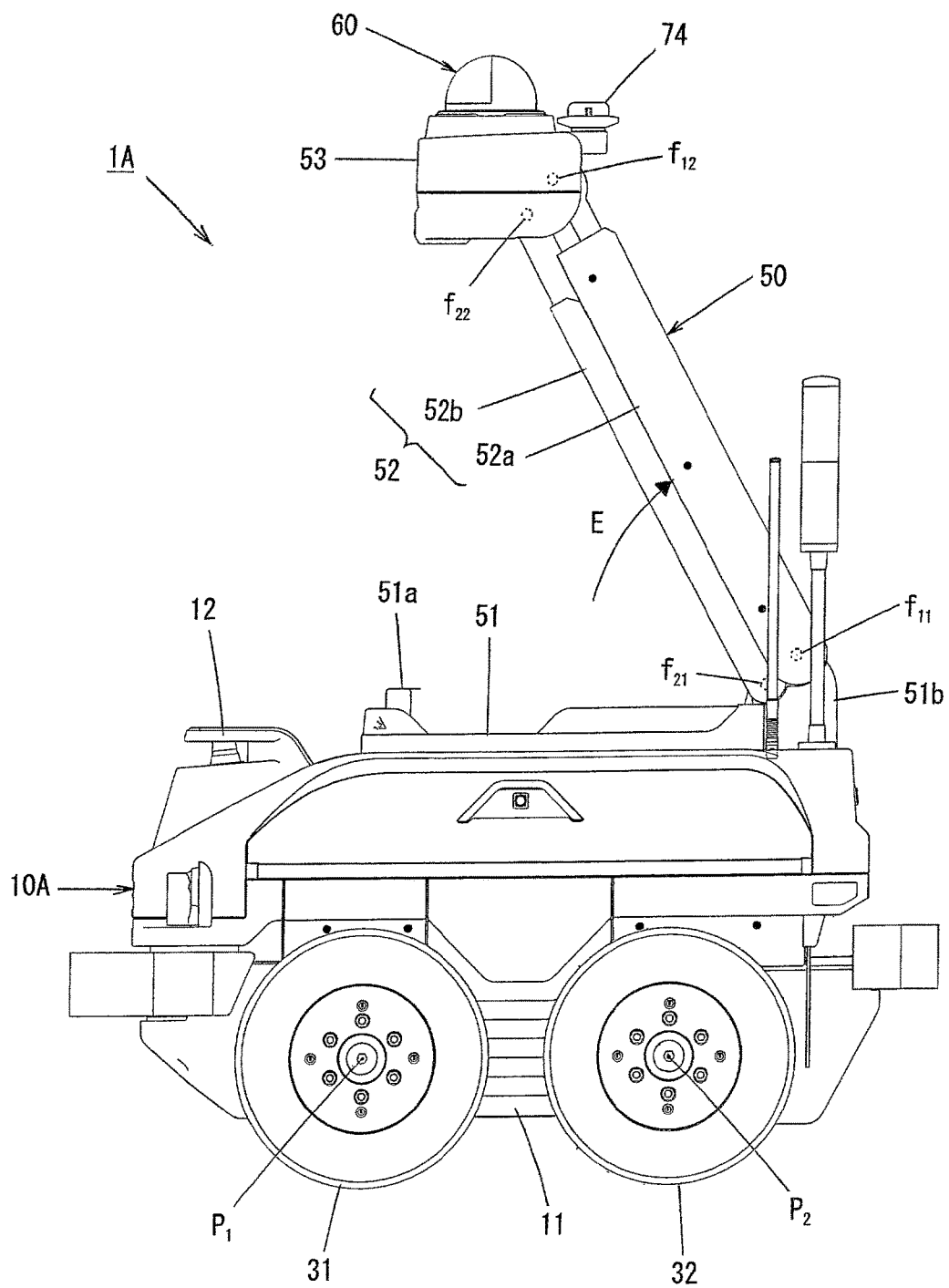
FIG. 4 is a left side view illustrating the state in which an imaging unit of the mobile vehicle ascends according to the first embodiment.
Figure 5:
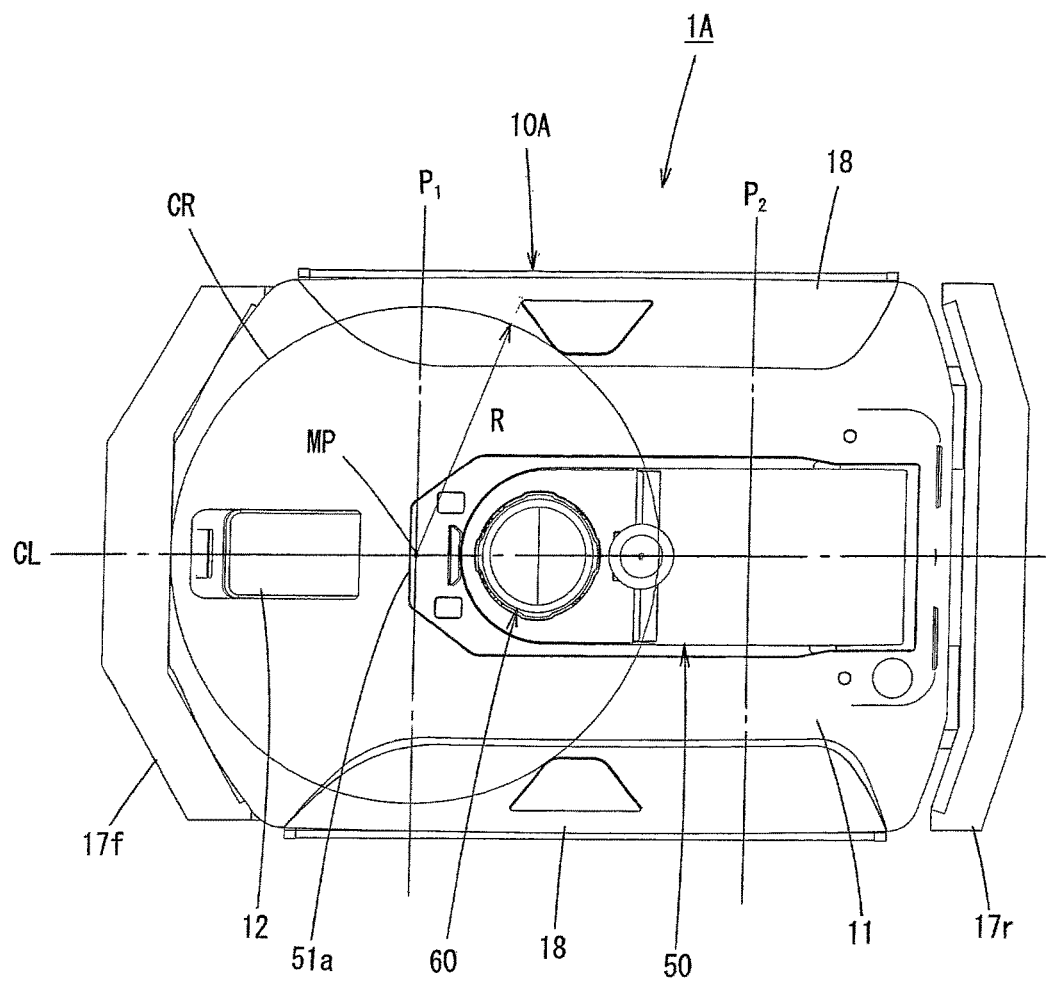
FIG. 5 is a plan view of the mobile vehicle illustrated in FIG. 4 viewed from top.

FIG. 1 is a diagram for describing a schematic configuration of an electric undercarriage of a mobile vehicle according to a first embodiment of the present invention, wherein (A) is a left side view, and (B) is a sectional view viewed from an arrow along a line B-B in (A). Also, FIG. 2 is a left side view illustrating the mobile vehicle according to the first embodiment, and FIG. 3 is a plan view of the mobile vehicle viewed from top. Further, FIG. 4 is a left side view illustrating the state in which an imaging unit of the mobile vehicle ascends according to the first embodiment, and FIG. 5 is a plan view of the mobile vehicle illustrated in FIG. 4 viewed from top.

The mobile vehicle 1A according to the first embodiment mainly includes an electric undercarriage 10A, a lift mechanism unit 50 provided on the electric undercarriage 10, and a surveillance camera 60 provided at the leading end of the lift mechanism unit 50 and serving as an imaging unit. The first embodiment describes that the mobile vehicle is an autonomous surveillance vehicle including the surveillance camera 60.

More specifically, a distance detection unit 12 is provided on the front end of the electric undercarriage 10A, a Wi-Fi antenna 71 and a warning light 72 are mounted on the rear end of the electric undercarriage 10A, CCD cameras 73 are mounted on the left and right side faces and the rear end face of the electric undercarriage 10A, and a GPS antenna 74 is mounted at the leading end of the lift mechanism unit 50 at the back of the imaging unit 60.

The distance detection unit 12 has a function of confirming a moving region ahead or the condition of the road surface, and includes a light-emitting unit that emits light, a light-receiving unit that receives light, and a scanning control unit that scans the emission direction of light in order that the light is emitted to a plurality of predetermined measured points in the space ahead.

LIDAR (Light Detection and Ranging or Laser Imaging Detection and Ranging) that measures distances at a plurality of measured points in a predetermined distance measurement region by emitting laser to a two-dimensional space or a three-dimensional space in the distance measurement region can be employed for the distance detection unit 12.

A control unit, not illustrated, executes a traveling function or a surveillance function of the mobile vehicle 1A, and is composed of a control section, a person detection section, an instruction recognizing section, a communication section, an instruction executing section, a storage section, and the like.

The mobile vehicle 1A is configured to preliminarily store map information and moving route information of a region where the mobile vehicle 1A is to travel, and to travel on a predetermined route, while avoiding an obstacle, by utilizing information acquired from the surveillance camera 60, the distance detection unit 12, and the GPS (Global Positioning System).

In this case, the mobile vehicle 1A recognizes a posture of a person issuing instruction by particularly utilizing the surveillance camera 60, the distance detection unit 12, or the like, and autonomously travels while recognizing the condition ahead of the electric undercarriage 10A in the traveling direction on the basis of the instruction previously associated with this posture. For example, when detecting that there is an obstacle or a step ahead, the mobile vehicle 1A stops, turns, moves backward, or moves forward to change its course, and executes a function corresponding to the instruction, in order to prevent the collision against the obstacle.

Next, the configuration concerning the traveling of the mobile vehicle 1A will mainly be described with reference to FIGS. 1(A) and 1(B). Note that a front wheel 31 and a rear wheel 32 on the left are indicated by a two-dot chain line in FIG. 1(A).

<Description of Electric Undercarriage>

The electric undercarriage 10A includes an undercarriage body 11, four wheels mounted at the front part, the rear part, the left part, and the right part of the undercarriage body 11, two electric motors 41R and 41L that independently and rotationally drive a pair of left and right wheels on at least one of the front part and the rear part out of the four wheels, a battery 40 that supplies electric power to the two electric motors 41R and 41L, the distance detection unit 12, and the control unit not illustrated.

Figure 1B:
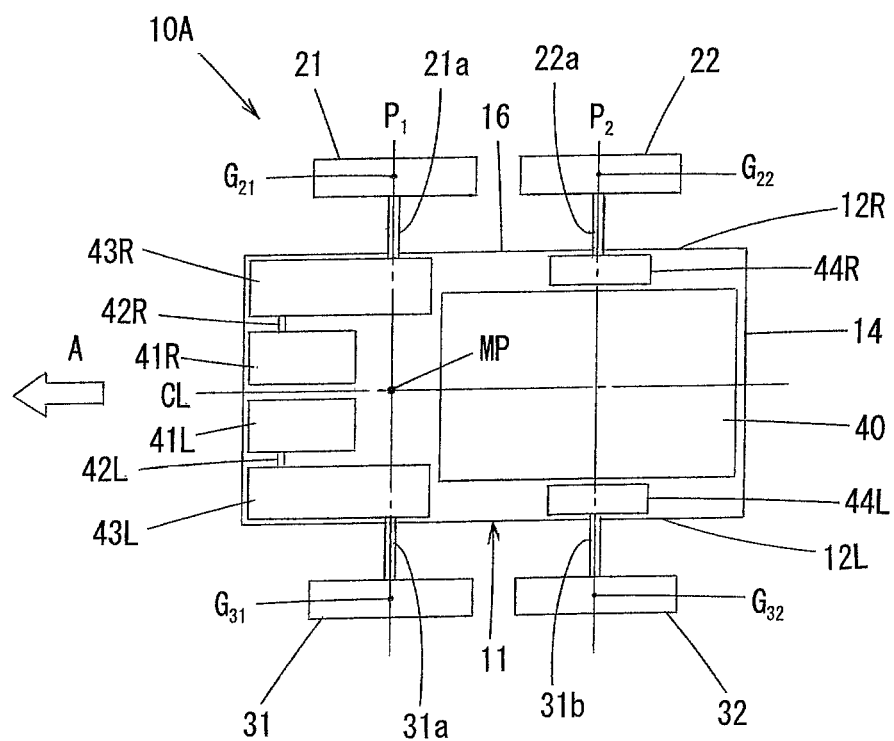

In the first embodiment, as illustrated in FIGS. 1(A) and 1(B), the left and right wheels at the side close to an arrow A are the front wheels 21 and 31, the remaining left and right wheels are rear wheels 22 and 32, and the left and right front wheels 21 and 31 are independently controlled to be driven by the two electric motors 41R and 41L, in order to move the electric undercarriage 10A forward in the direction of the arrow A.

FIGS. 1(A) and 1(B) are provided to only describe the components composing the electric undercarriage and the arrangement of these components. It is to be noted that the size, the space, and the like of each component of the electric undercarriage illustrated in FIGS. 1(A) and 1(B) do not always coincide with those of the electric undercarriage illustrated in FIGS. 2 and 3.

Bumpers 17f and 17r are mounted at a front surface 13 and a rear surface 14 of the undercarriage body 11, and band-like covers 18 are provided on a right side face 12R and a left side face 12L to extend in the front-back direction of the undercarriage body 11. Axels 21a and 31a and axels 22a and 32a that rotationally support the front wheels 21 and 31 and the rear wheels 22 and 32, respectively, are mounted below the covers 18.

The axels 21a and 31a of the front wheels 21 and 31, which are drive wheels, are disposed on the same first axis $P_1$ (axle line of the front wheels), and the axles 22a and 32a of the rear wheels 22 and 32, which are driven wheels, are disposed on the same second axis $P_2$ (axle line of the rear wheels).

Notably, the axels 21a, 31a, 22a, and 32a can independently rotate.

Two motors which are the electric motor 41R for driving the right front wheel 21 and the electric motor 41L for driving the left front wheel 31 are provided close to the front wheels on the bottom surface 15 of the undercarriage body 11. A gear box 43R is provided as a power transmission mechanism between a motor shaft 42R of the right electric motor 41R and the axle 21a of the right front wheel 21. Similarly, a gear box 43L is provided as a power transmission mechanism between a motor shaft 42L of the left electric motor 41L and the axle 31a of the left front wheel 31. In the present embodiment, the two electric motors 41R and 41L are disposed side by side so as to be symmetric with respect to a centerline CL of the undercarriage body 11 in the traveling direction (the direction of the arrow A), and the gear boxes 43R and 43L are mounted at the outside of the electric motors 41R and 41L in the horizontal direction.

Each of the gear boxes 43R and 43L is an assembly that includes a plurality of gears and shafts to transmit power from the corresponding electric motor to the corresponding axle serving as an output shaft by changing the torque, rotating speed, and rotation direction. Each of the gear boxes 43R and 43L may include a clutch that switches between power transmission and power shutoff. A pair of rear wheels 22 and 32 is pivotally supported respectively by bearings 44R and 44L which are respectively mounted to be close to the right side face 12R and the left side face 12L on the bottom surface 15 of the undercarriage body 11.

According to the above configuration, the right front wheel 21 and the left front wheel 31 in the traveling direction can be independently driven. That is, power from the right electric motor 41R is transmitted to the gear box 43R through the motor shaft 42R, and transmitted to the axle 21a with the rotating speed, torque, or rotation direction being changed by the gear box 43R. Then, the front wheel 21 rotates with the rotation of the axle 21a. The power transmission from the left electric motor 41L to the front wheel 31 is similar to the power transmission for the right side described above.

The mobile vehicle 1A moves forward or backward by setting the gear ratios (speed reduction ratios) of the gear boxes 43R and 43L to be the same, if the rotating speeds of the right electric motor 41R and the left electric motor 41L are the same. In order to change the speed of the mobile vehicle 1A, the gear ratios of the gear boxes 43R and 43L may be changed while keeping at the same value.

In order to change the traveling direction, the gear ratios of the gear boxes 43R and 43L are changed to cause a difference between the rotating speed of the right front wheel 21 and the left front wheel 31. Further, when the right wheels and the left wheels are rotated in the opposite directions at the same rotating speed by changing the rotating direction of the output from each of the gear boxes 43R and 43L, the mobile vehicle 1A can perform a stationary turn around a middle point MP of the axle line $P_1$ of a pair of front wheels 21 and 31 as a stationary turn center point.

The mobile vehicle 1A is not provided with a steering mechanism for varying the angles of the front and rear wheels. Therefore, in order to turn the mobile vehicle 1A while stationary, resistance applied to the wheels is increased, as the space (wheel base) between the front and rear wheels is larger, and thus, large drive torque for the turn is needed. However, since the gear ratios of the gear boxes 43R and 43L are variable, large torque can be applied to the wheels only by decreasing the rotating speeds of the wheels during the turn.

For example, in the case where the number of teeth of the gear on the side of the motor shaft 42R is set to be 10, the number of teeth of an intermediate gear is set to be 20, and the number of teeth of the gear on the side of the axle 21b is set to be 40, as the gear ratio in the gear box 43R, four-fold torque can be obtained, although the rotating speed of the axle 21b becomes a fourth the rotating speed of the motor shaft 42R. Further, larger torque can be obtained by selecting the gear ratio by which the rotating speed is more decreased. Therefore, the mobile vehicle 1A can turn on a road surface which applies large resistance to the wheels, such as an irregular ground or a sand place.

The wheels are not particularly limited. In the first embodiment, the front wheels 21 and 31 and rear wheels 22 and 32 are the same. Specifically, as illustrated in FIG. 2, the front wheel 31 and the rear wheel 32 include wheel bodies 31a and 32a, and tires 31b and 32b which are mounted at the outer peripheral part of the wheel bodies 31a and 32a and filled with air. The front and rear wheels 21 and 22 on the right are similarly configured.

Since at least the right and left front wheels 21 and 31 which are the drive wheels have tires filled with air, the vibration caused when the mobile vehicle 1A runs on an irregular road surface can be absorbed by the tires of the front wheels 21 and 31. Thus, an image blur of the imaging unit 60 disposed close to the front wheels 21 and 31 can further be suppressed.

The mobile vehicle 1A includes the gear boxes 43R and 43L between the motor shafts 42R and 42L and the axels 21a and 31a, whereby vibration from the front wheels 21 and 31 is not directly transmitted to the motor shafts. In addition, it is desirable that a clutch which transmits or disconnects (shuts off) power is provided to the gear boxes 43R and 43L, and the power transmission between the electric motors 41R and 41L and the axles 21a and 31a serving as drive shafts is shut off, when electric power is not supplied to the electric motors 41R and 41L. According to this configuration, even if the wheels rotate while the mobile vehicle 1A stops due to the application of force to the undercarriage body 11, the rotation is not transmitted to the electric motors 41R and 41L. Therefore, back electromotive force is not generated on the electric motors 41R and 41L, and therefore, there is no chance that the circuits of the electric motors 41R and 41L are damaged.

As described above, the two electric motors 41R and 41L are provided close to the front wheels 21 and 31 on the bottom surface 15 of the undercarriage body 11 on the right and left in the traveling direction, and the gear boxes 43R and 43L are mounted on the right of the electric motor 41R and on the left of the electric motor 41L. On the other hand, only the bearings 44R and 44L are mounted close to the rear wheels 22 and 32 on the bottom surface 15. Therefore, a wide storage space 16 can be ensured on the bottom surface 15 of the undercarriage body 11 throughout from the center thereof to the rear end of the vehicle body. A battery (rechargeable battery) 40 such as a lithium ion battery is used as a power source for each of the electric motors 41R and 41L. The battery 40 is stored in the storage space 16. Specifically, the battery 40 has an outer shape of a rectangular solid, and can be placed at substantially the center of the bottom surface 15 as illustrated in FIG. 1(B). The rear surface 14 of the undercarriage body 11 is desirably configured to be openable with respect to the top surface or the bottom surface 15 to facilitate the insertion and removal of the battery 40 into and from the storage space 16. According to this, a large-capacity battery 40 for implementing long-time traveling can be placed in the storage space 16 of the undercarriage body 11. In addition, the operation of exchanging, charging, or inspecting the battery 40 can easily be performed from the rear surface 14. Further, the battery 40 can be placed on the bottom surface 15, whereby an electric vehicle having low center of gravity of the undercarriage body 11 and capable of stably traveling can be obtained.

<Description of Lift Mechanism Unit and Imaging Unit>

As illustrated in FIGS. 2 to 5, the lift mechanism unit 50 is configured to move the surveillance camera 60 serving as the imaging unit in the vertical direction and in the front-back direction with respect to the electric undercarriage 10A in the first embodiment.

More specifically described, a link mechanism, specifically a parallel link mechanism, having a boom 52 that swings in the vertical direction and in the front-back direction is used as the lift mechanism unit 50.

That is, the lift mechanism unit 50 includes an underframe 51 fixed on the undercarriage body 11 to extend in the front-back direction, the boom 52 that is mounted at the rear end of the underframe 51 so as to be swingable around a lateral axis, a balance unit 53 provided at the leading end of the boom 52, and an unillustrated telescopic cylinder that is provided in the underframe 51 to vertically swing the boom 52.

The underframe 51 includes a support unit 51a that is provided on the front end of the underframe 51 for supporting the descending boom 52, and a pivot unit 51b that is provided at the rear end of the underframe 51 to pivotally support the base end of the boom 52.

The boom 52 has a main frame 52a and a balance unit support rod 52b provided along the main frame 52a.

The base end of the main frame 52a is fixed to a first base end shaft $f_{11}$ pivotally mounted to the pivot unit 51b of the underframe 51 so as to be rotatable, and the leading end of the main frame 52a is pivotally mounted to the balance unit 53 through a first leading end shaft $f_{12}$.

The base end of the balance unit support rod 52b is fixed to a second base end shaft $f_{21}$ pivotally mounted to the pivot unit 51b of the underframe 51, and the leading end of the balance unit support rod 52b is pivotally mounted to the balance unit 53 through a second leading end shaft $f_{22}$.

An electric cylinder, a hydraulic cylinder, or a pneumatic cylinder can be used as the unillustrated telescopic cylinder.

The base end of the telescopic cylinder is pivotally mounted to the underframe 51 or the undercarriage body 11 so as to be swingable in the vertical direction, and the leading end of the telescopic cylinder is coupled to the first base end shaft $f_{11}$ through an arm not illustrated. In this case, the leading end of the telescopic cylinder is pivotally mounted to one end of the arm, and the other end of the arm is fixed to the first base end shaft $f_{11}$.

The balance unit 53 is a balancing device that stably keeps normal attitudes of the surveillance camera 60 and the GPS antenna 74, even if the boom 52 swings in the vertical direction.

The surveillance camera 60 is not particularly limited. For example, a doom camera (pan-tilt-zoom (PTZ) camera), a box camera, a housing camera, an infrared night vision camera, a telecamera, or the like can be used for the surveillance camera 60. The surveillance camera 60 is placed on the balance unit 53 such that space regions ahead and on the right and left of the electric undercarriage 10A can be photographed. When the mobile vehicle 1A is used outdoors, a waterproof function is added to the surveillance camera 60.

Further, as a doom camera, the one of a type having a wide angle of view of a lens in the horizontal and vertical directions (e.g., about 180° in the horizontal direction, and about 90° in the vertical direction), the one of a high-resolution type (e.g., 3840×2160 pixels), the one of a type that enables color photographing, the one of a type that performs photographing only when detecting a person, the one of a type that detects a person and tracks the person by zooming in on his/her face, and an infrared night vision camera that can photograph in darkness may be used.

Next, the operation of the lift mechanism unit 50 will be described.

FIGS. 2 and 3 illustrate the state in which the lift mechanism unit 50 descends, and at that time, the telescopic cylinder extends. To lift the lift mechanism unit 50, the telescopic cylinder is contracted. According to this, the arm pivotally mounted to the leading end of the telescopic cylinder is pulled forward, and the arm, the first base end shaft $f_{11}$, and the main frame 52a integrally swing upward (in the direction of an arrow E). Further, since the main frame 52a swings upward, the balance unit support rod 52b coupled to the leading end of the main frame 52a through the balance unit 53 is lifted up (in the direction of the arrow E).

In this case, the second leading end shaft $f_{22}$ of the balance unit 53 is drawn toward the balance unit support rod 52b due to the parallel positional deviation of the balance unit support rod 52b with respect to the main frame 52a. Thus, the normal attitudes of the balance unit 53, and the surveillance camera 60 and the GPS antenna 74 placed on the balance unit 53 are maintained from the descending position to the ascending position.

When the telescopic cylinder is extended, the boom 52 performs the operation reverse to the above operation, so that it is in the descending state illustrated in FIG. 2 from the ascending state illustrated in FIG. 4.

As described above, the surveillance camera 60 moves in the front-back direction across the first axel line $P_1$ by the lift mechanism unit 50.

The surveillance camera 60 placed on the balance unit 53 of the lift mechanism unit 50 having the above configuration is disposed in a region of a circle CR which falls within an inner region of the electric undercarriage 10A and is centered at the stationary turn center point MP (middle point MP on the axle line $P_1$ of a pair of front wheels 21 and 31) of the electric undercarriage 10A in a plan view.

In this case, the radius R of the circle CR is set to be shorter than the distance from the middle point MP to the outer peripheral edge of the electric undercarriage 10A in a plan view so as to prevent the surveillance camera 60 from colliding against an obstacle while the vehicle travels. Specifically, in a plan view, the radius R is shorter than the distance between the axle lines $P_1$ and $P_2$ of the front and rear wheels, and shorter than the distance from the stationary turn center point MP to the right side face or the left side face of the electric undercarriage 10A.

In the first embodiment, as for centers $G_{21}$, $G_{31}$, $G_{22}$, and $G_{32}$ of four contact areas of a pair of front wheels 21 and 31 and a pair of rear wheels 22 and 32 illustrated in FIG. 1(B), the distance between the centers $G_{21}$ and $G_{22}$ (between $G_{31}$ and $G_{32}$) is about 450 to 550 mm, the distance between the centers $G_{21}$ and $G_{31}$ (between $G_{22}$ and $G_{32}$) is about 650 to 750 mm, and the radius R is about 300 to 500 mm. Further, the height of the surveillance camera 60 in the descending position is about 850 to 1050 mm, and the height of the surveillance camera 60 in the ascending position is about 1650 to 1900 mm.

In addition, the surveillance camera 60 is disposed on the centerline CL passing through the stationary turn center point MP in the front-back direction. The centerline CL and the first axle line $P_1$ are mutually orthogonal on the middle point MP in the region of the circle CR. Thus, an equivalent effect of suppressing an image blur can be obtained both in the counterclockwise turn and in the clockwise turn of the mobile vehicle 1A.

The surveillance camera 60 at the descending position illustrated in FIG. 3 is placed anterior to the middle point MP (stationary turn center point MP), and the surveillance camera 60 at the ascending position illustrated in FIG. 5 is located posterior to the middle point MP. In either case, the surveillance camera 60 is within the region of the narrow circle CR centered at the middle point MP. That is, the movement range of the surveillance camera 60, which is lifted and lowered by the lift mechanism unit 50, in a plan view falls within the region of the narrow circle CR. Therefore, the shake of the surveillance camera 60 at the leading end of the boom 52 is suppressed to prevent an image blur when the surveillance camera 60 which is located at the ascending position photographs the surrounding space while turning clockwise or counterclockwise, as well as when the surrounding space is photographed by the surveillance camera 60 located at the descending position. Notably, the shake of the surveillance camera 60 at the descending position during the turn is also effectively suppressed, since the boom 52 of the lift mechanism 50 at the descending position is supported by the support unit 51a.

Further, when the right and left front wheels 21 and 31 are rotated in the opposite directions at the same rotating speed, the mobile vehicle 1A turns while stationary around the middle point MP (stationary turn center point MP). At that time, since the surveillance camera 60 at the ascending position as illustrated in FIG. 5 is located close to the stationary turn center point MP, the shake thereof is suppressed, and thus, an image blur can be suppressed.

(Second Embodiment)

Figure 7:
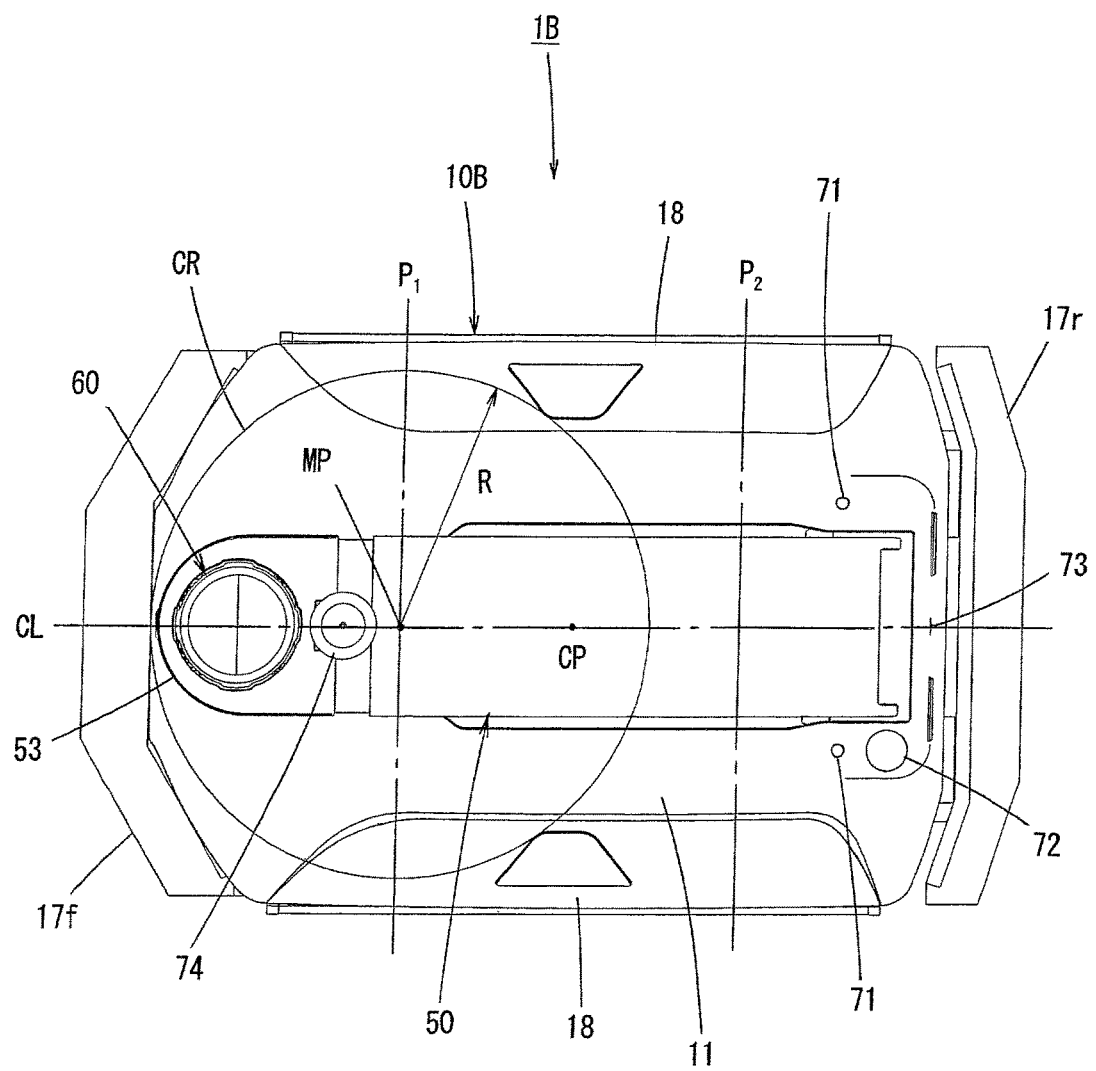
FIG. 7 is a plan view illustrating the mobile vehicle according to the second embodiment.
Figure 8:
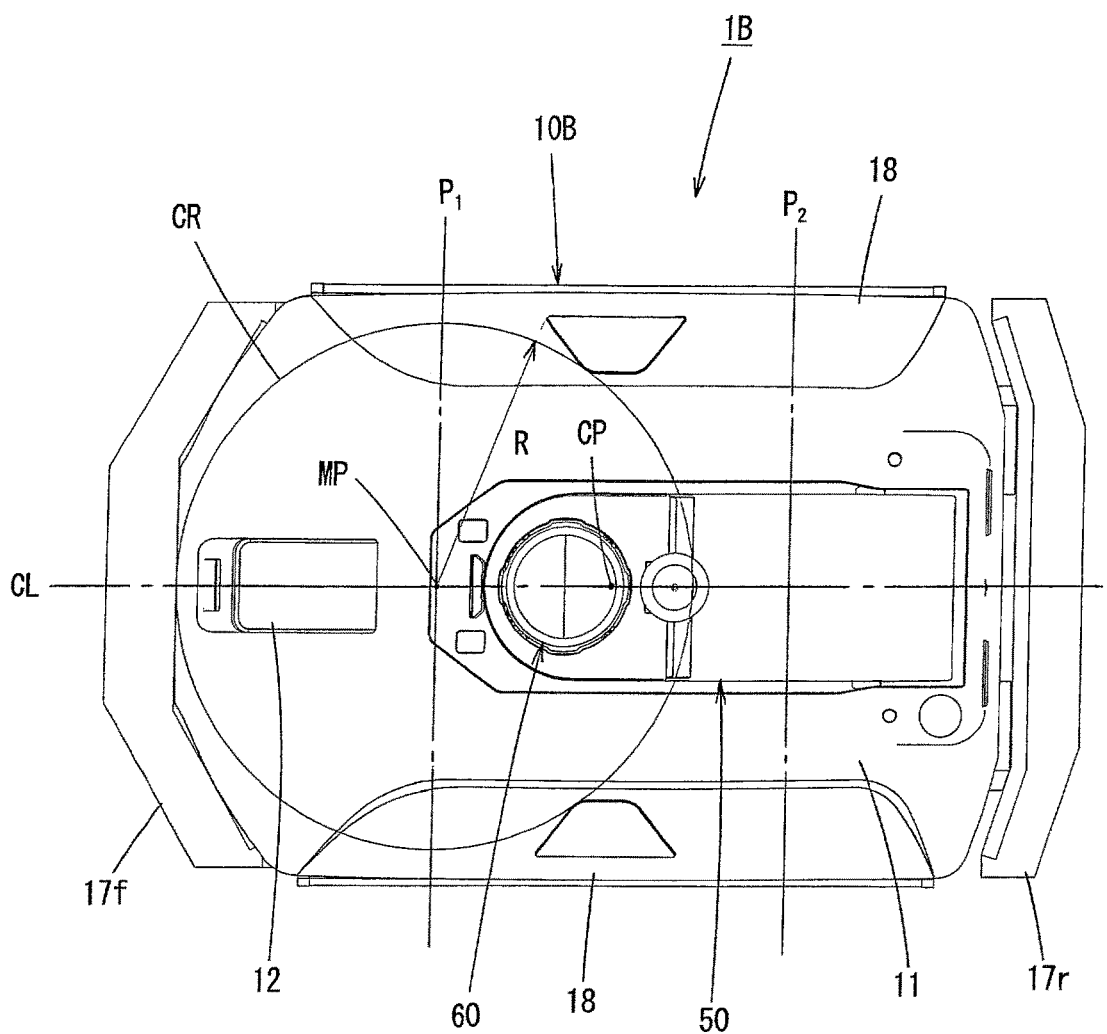
FIG. 8 is a plan view illustrating the state in which an imaging unit of the mobile vehicle ascends according to the second embodiment.

FIG. 6 is a diagram for describing a schematic configuration of an electric undercarriage of a mobile vehicle according to a second embodiment of the present invention, wherein (A) is a left side view, and (B) is a sectional view viewed from an arrow along a line B-B in (A). Also, FIG. 7 is a plan view illustrating the mobile vehicle according to the second embodiment, and FIG. 8 is a plan view illustrating the state in which an imaging unit of the mobile vehicle ascends according to the second embodiment. It is to be noted that, in FIGS. 6 to 8, the components same as those in FIGS. 1 to 5 are identified by the same reference numerals.

The different point in the second embodiment from the first embodiment will mainly be described below.

The mobile vehicle 1B according to the second embodiment includes an electric undercarriage 10B which is formed by adding a right power transmission mechanism 45R that connects the front and rear wheels 21 and 22 on the right and a left power transmission mechanism 45L that connects the front and rear wheels 31 and 32 on the left to the electric undercarriage 10A of the mobile vehicle 1A according to the first embodiment. The mobile vehicle 1B also includes a lift mechanism unit 50 similar to that in the first embodiment on the electric undercarriage 10B.

Specifically, a pair of front wheel 21 and rear wheel 22 on the right and a pair of front wheel 31 and rear wheel 32 on the left operate in conjunction with each other by belts 23 and 33 serving as a power transmission member. The other configuration is similar to the first embodiment.

The right power transmission mechanism 45R is specifically configured as described below.

A pulley 21b is provided to the axle 21a of the front wheel 21 on the right, and a pulley 22b is provided to the axle 22a of the rear wheel 22. For example, the belt 23 provided with projections engaged with a plurality of grooves formed on the outer peripheral surfaces of the pulleys 21b and 22b is stretched between the pulley 21b of the front wheel 21 and the pulley 22b of the rear wheel 22.

In a left power transmission mechanism 45L, a pulley 31b is provided to the axle 31a of the front wheel 31 on the left, a pulley 32b is provided to the axle 32a of the rear wheel 32, and the belt 33 having the similar structure to the belt 23 is stretched between the pulley 31b of the front wheel 31 and the pulley 32b of the rear wheel 32, as in the right power transmission mechanism 45R.

With this, the front wheel and the rear wheel on the right (21 and 22) and the front wheel and the rear wheel on the left (31 and 32) are interconnected and driven by the belt (23 and 33). Therefore, it is only necessary that one of the front and rear wheels is driven. The second embodiment describes that the front wheels 21 and 31 are driven. When one wheel is used as a drive wheel, the other wheel functions as a driven wheel driven by the belt, which is the power transmission member, without causing a slip.

As the power transmission member for interconnecting and driving the front wheel and the rear wheel, a sprocket and a chain engaged with the sprocket may be used, besides the pulley and the belt provided with the projections engaged with a plurality of grooves formed on the outer periphery of the pulley. If a slip is permitted, a pulley and a belt having large friction may be used as the power transmission member. However, the power transmission member has to be configured such that the rotating speed of the drive wheel and the rotating speed of the driven wheel become the same.

Figure 6A:
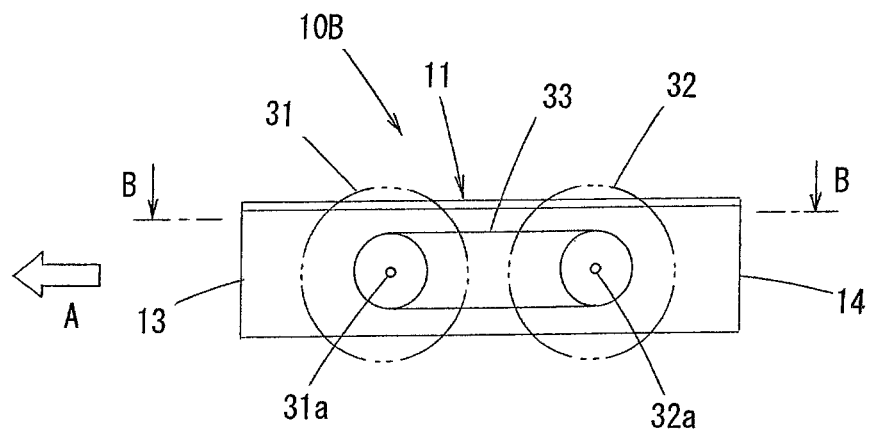
FIG. 6 is a diagram for describing a schematic configuration of an electric undercarriage of a mobile vehicle according to a second embodiment of the present invention, wherein (A) is a left side view, and (B) is a sectional view viewed from an arrow along a line B-B in (A)
Figure 6B:
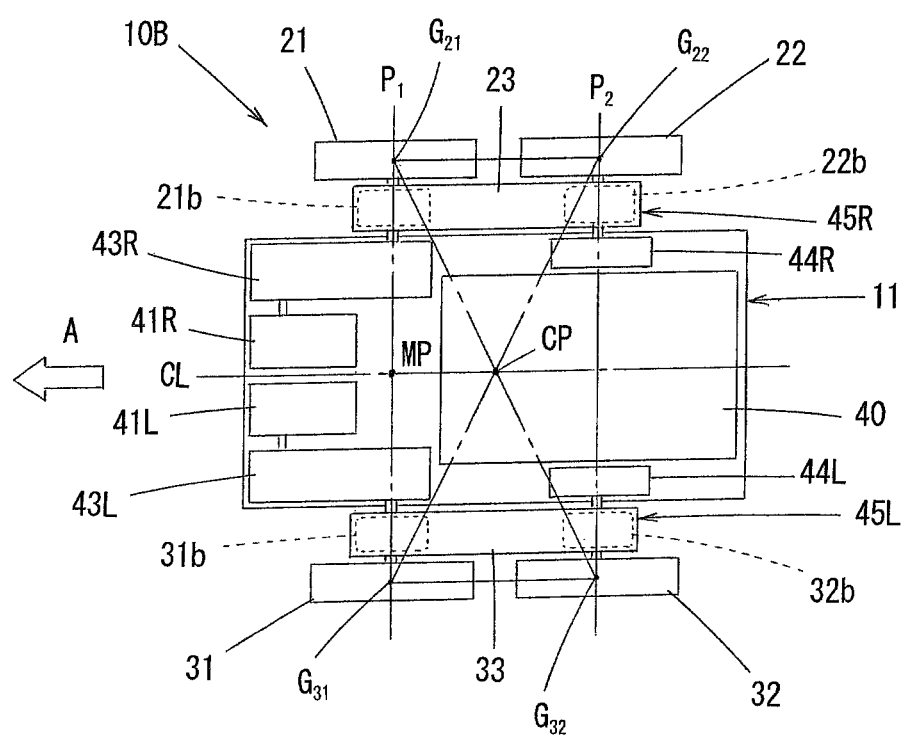

In FIGS. 6(A) and 6(B), the front wheels (21, 31) correspond to the drive wheels, and the rear wheels (22, 32) correspond to the driven wheels.

According to the above configuration, the front and rear wheels 21 and 22 on the right and the front and rear wheels 31 and 32 on the left can be independently driven. That is, power from the right electric motor 41R is transmitted to the gear box 43R through the motor shaft 42R, and transmitted to the axle 21a with the rotating speed, torque, or rotation direction being changed by the gear box 43R. Then, the front wheel 21 rotates with the rotation of the axle 21a, and the rotation of the axle 21a is transmitted to the rear shaft 22b through the pulley 21b, the belt 23, and the pulley 22b to rotate the rear wheel 22. The power transmission from the left electric motor 41L to the front wheel 31 and the rear wheel 32 is similar to the power transmission for the right side described above.

The mobile vehicle 1B moves forward or backward by setting the gear ratios (speed reduction ratios) of the gear boxes 43R and 43L to be the same, if the rotating speeds of the right electric motor 41R and the left electric motor 41L are the same. In order to change the speed of the mobile vehicle 1B, the gear ratios of the gear boxes 43R and 43L may be changed while keeping at the same value.

In order to change the traveling direction, the gear ratios of the gear boxes 43R and 43L are changed to cause a difference between the rotating speed of the front wheel 21 and the rear wheel 22 on the right and the rotating speed of the front wheel 31 and the rear wheel 32 on the left. Further, when the right wheels and the left wheels are rotated in the opposite directions at the same rotating speed by changing the rotating direction of the output from each of the gear boxes 43R and 43L, the mobile vehicle 1B can perform a stationary turn around a center point CP of a rectangular area enclosed by centers $G_{21}$, $G_{31}$, $G_{22}$, and $G_{32}$ of four contact areas of a pair of front wheels 21 and 31 and a pair of rear wheels 22 and 32. In the second embodiment, the central part of the undercarriage body 11 is set to substantially coincide with the center point CP.

As described above, the four wheels are driven such that the front and rear wheels on each right and left side are coupled to each other with the power transmission member and can be driven by two electric motors mounted close to the front wheels. Thus, this configuration eliminates the need to provide an electric motor exclusive to the rear wheels and the need to provide a gear box which is exclusive to the rear wheels and required between the electric motor and the rear wheels. Accordingly, an installation space for the electric motor and the gear box exclusive to the rear wheels can be reduced.

As illustrated in FIG. 8, in the mobile vehicle 1B according to the second embodiment, the surveillance camera 60 at the ascending position is disposed almost directly above the stationary turn center point (center point CP), whereby the shake of the surveillance camera 60 at the ascending position and an image blur during the stationary turn can effectively be prevented. Also, as illustrated in FIG. 7, the surveillance camera 60 at the descending position is disposed within the region of the circle CR centered at the middle point MP of the first axle line $P_1$ of the left and right front wheels 21 and 31, whereby the shake of the surveillance camera 60 at the descending position and the image blur can effectively be prevented, even when the mobile vehicle 1B turns clockwise or counterclockwise with the difference in the rotation speed between the front and rear wheels 21 and 22 on the right and the front and rear wheels 31 and 32 on the left.

(Third Embodiment)

Figure 9A:
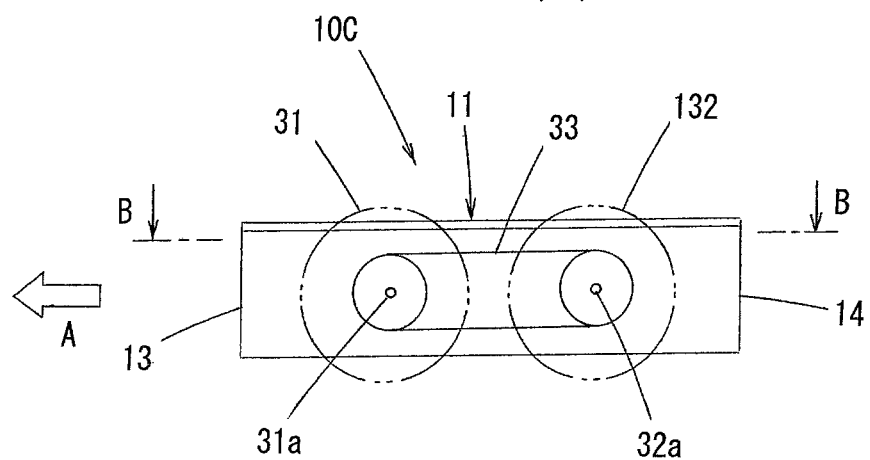
FIG. 9 is a diagram for describing a schematic configuration of an electric undercarriage of a mobile vehicle according to a third embodiment of the present invention, wherein (A) is a left side view, and (B) is a sectional view viewed from an arrow along a line B-B in (A)
Figure 9B:
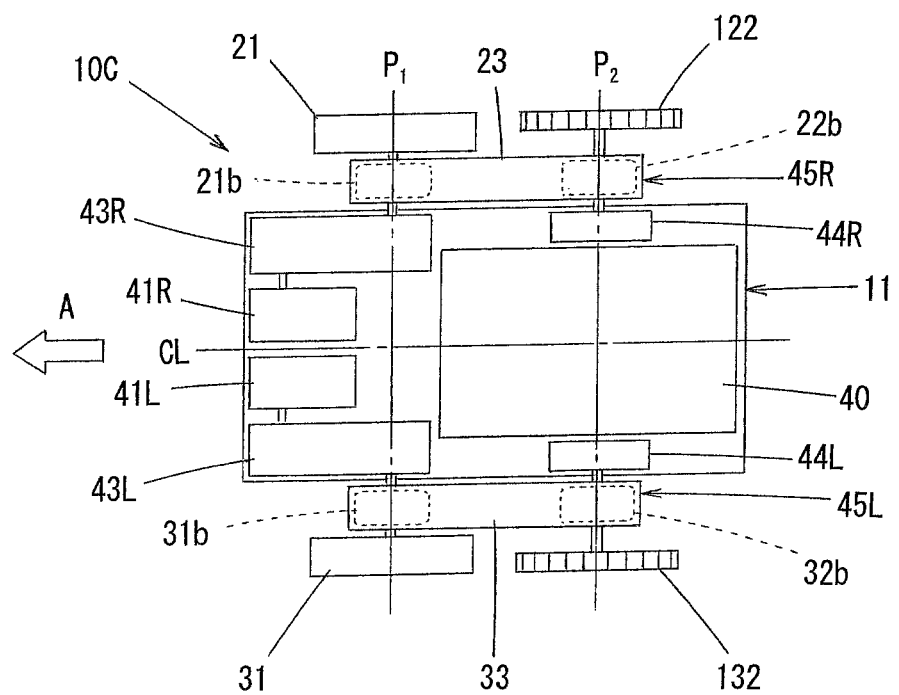
Figure 10:
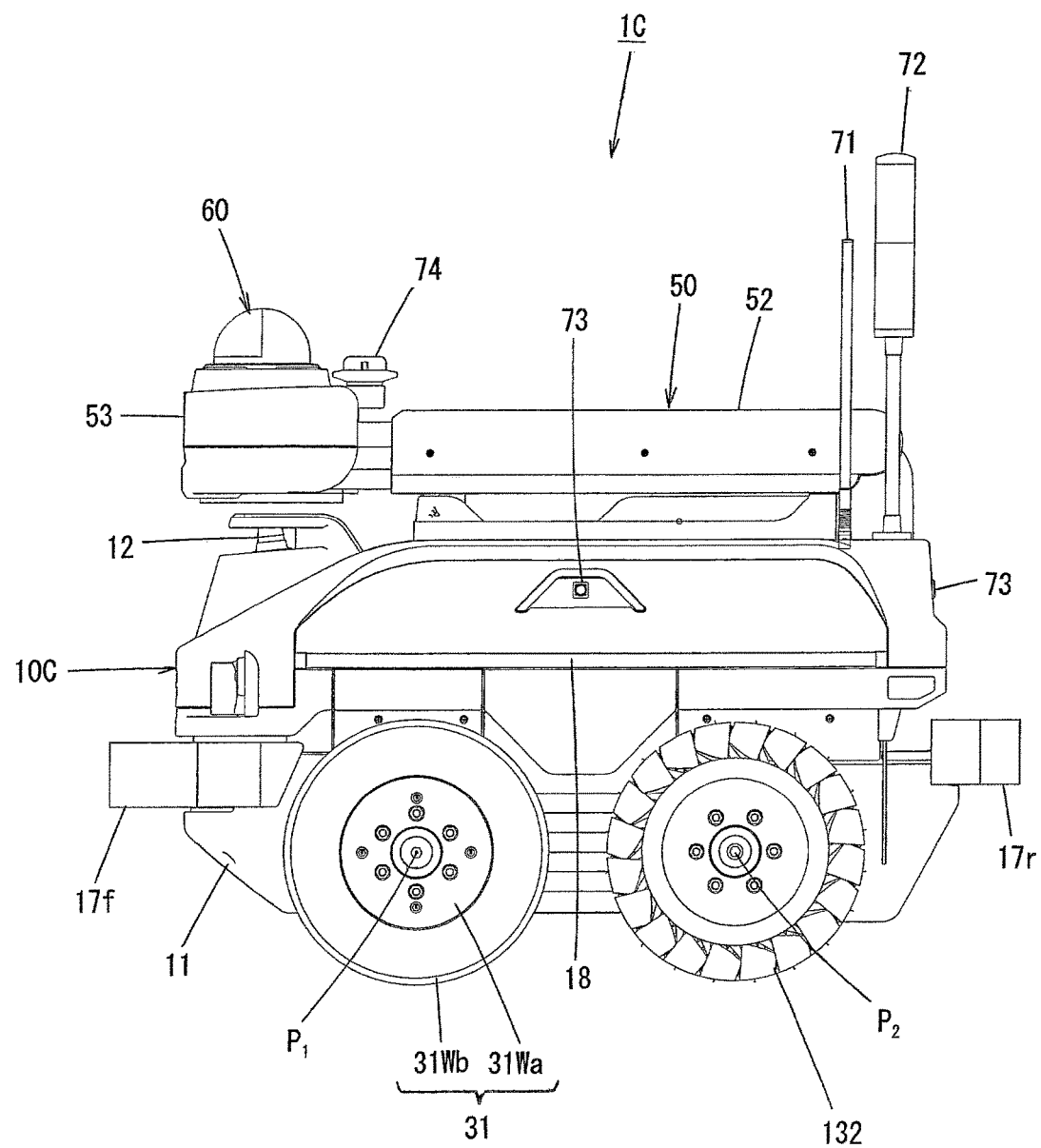
FIG. 10 is a left side view illustrating the mobile vehicle according to the third embodiment.

FIG. 9 is a diagram for describing a schematic configuration of an electric undercarriage of a mobile vehicle according to a third embodiment of the present invention, wherein (A) is a left side view, and (B) is a sectional view viewed from an arrow along a line B-B in (A). Also, FIG. 10 is a left side view illustrating the mobile vehicle according to the third embodiment. It is to be noted that, in FIGS. 9 and 10, the components same as those in FIGS. 1 to 8 are identified by the same reference numerals.

The different point in the third embodiment from the first and second embodiments will mainly be described below.

The mobile vehicle 1B (see FIG. 6(B)) according to the second embodiment uses a wheel with tire for each of wheels 21, 22, 31, and 32.

On the other hand, a mobile vehicle 1C according to the third embodiment uses an omni wheel (registered trademark) for each of left and right rear wheels 122 and 132. In this case, it is set such that the outer surfaces of the left and right front wheels 21 and 31 and the outer surfaces of the left and right rear wheels 122 and 132 are aligned on the same plane.

The other configuration of the third embodiment is similar to the second embodiment.

With the configuration in which omni wheels are used for the left and right rear wheels 122 and 132, the left and right rear wheels 122 and 132 can smoothly move in the horizontal direction during the turn of an electric undercarriage 10C. Therefore, when the left and right front wheels (wheels with tire) 21 and 31 are rotated in the opposite directions at the same rotating speed, the mobile vehicle 1C according to the third embodiment can smoothly turn while stationary around the middle point MP of the first axle line $P_1$ of the front wheels 21 and 31 with low torque.

According to the mobile vehicle 1C in the third embodiment, drive performance for driving the front wheels 21 and 31 and the rear wheels 122 and 132 can be obtained by the right power transmission mechanism 45R and the left power transmission mechanism 45L. In addition, the center point MP of the region of the circle CR (see FIG. 7) where the surveillance camera 60 is disposed is used as the stationary turn center point, whereby an image blur during the stationary turn can be suppressed.

It should be noted that, in the mobile vehicle 1C according to the third embodiment, a Mecanum wheel may be used for the left and right rear wheels 122 and 132 in place of an omni wheel.

(Fourth Embodiment)

Figure 11:
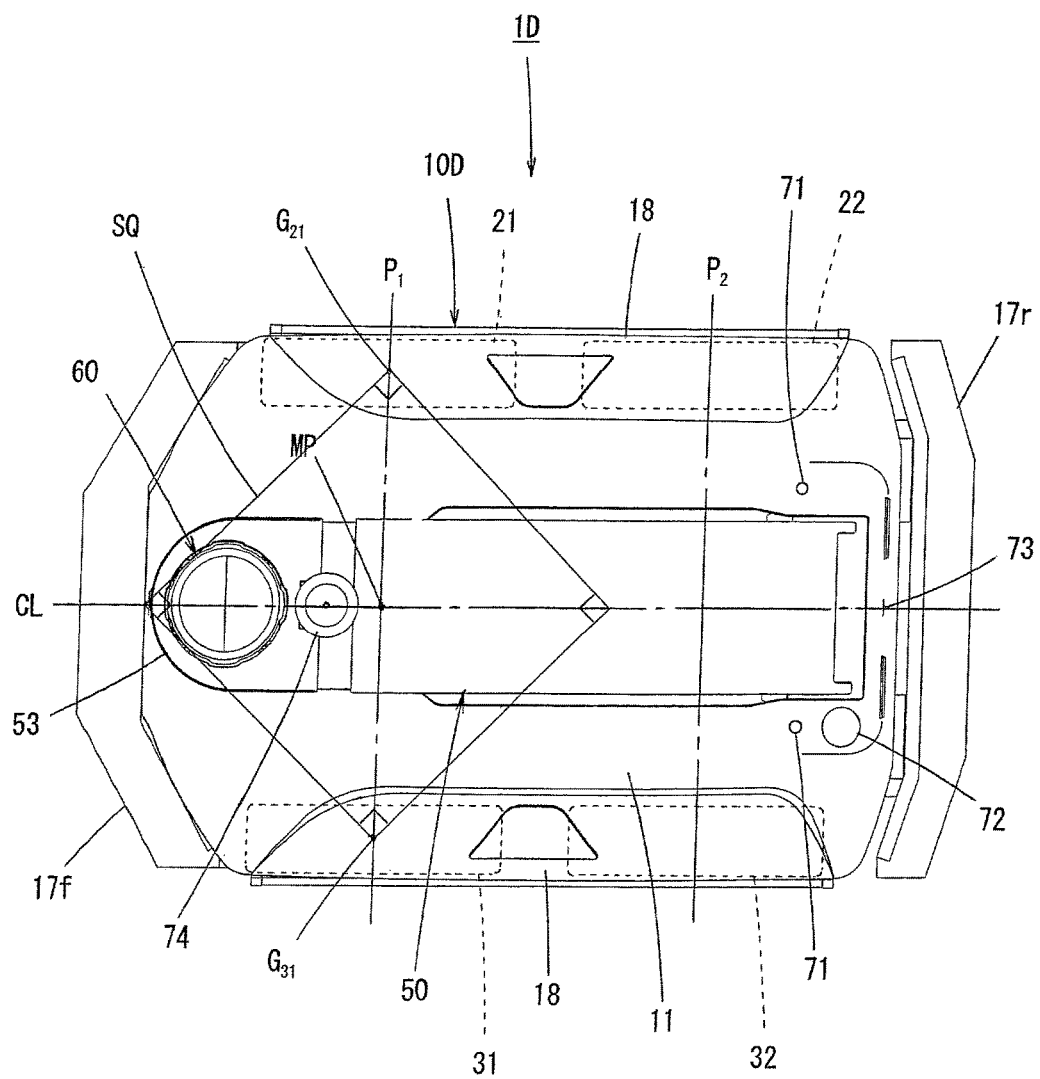
FIG. 11 is a plan view illustrating a mobile vehicle according to a fourth embodiment.
Figure 12:
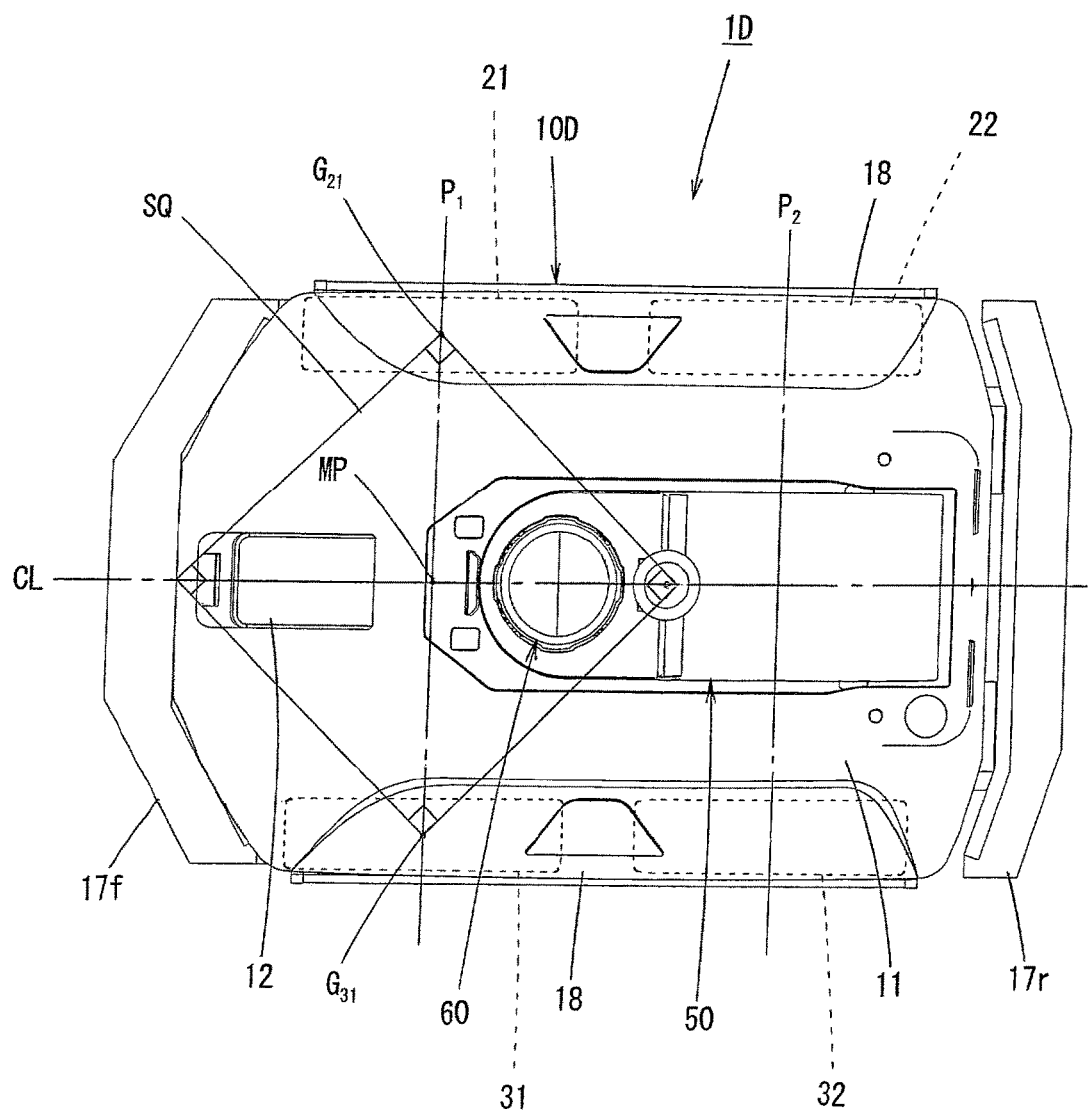
FIG. 12 is a plan view illustrating the state in which an imaging unit of the mobile vehicle ascends according to the fourth embodiment.

FIG. 11 is a plan view illustrating a mobile vehicle according to a fourth embodiment of the present invention, and FIG. 12 is a plan view illustrating the state in which an imaging unit ascends in the mobile vehicle according to the fourth embodiment. It is to be noted that, in FIGS. 11 and 12, the components same as those in FIGS. 3 and 5 are identified by the same reference numerals.

The different point in the fourth embodiment from the first embodiment will mainly be described below.

The first embodiment describes that, in a plan view, the surveillance camera 60 is disposed within the region of the circle CR, which is centered at the middle point MP of the axle line $P_1$ of the drive wheels (front wheels 21 and 31) and falls within the inner region of the electric undercarriage 10A, in either of the case where the surveillance camera 60 descends and the case where the surveillance camera 60 ascends.

On the other hand, in a mobile vehicle 1D according to the fourth embodiment, the surveillance camera 60 is disposed within a rectangle SQ, which is centered at the middle point MP on the axle line $P_1$ of the drive wheels (front wheels 21 and 31) and falls within the region of the circle CR, in a plan view, in either of the case where the surveillance camera 60 descends and the case where the surveillance camera 60 ascends. The region of the rectangle SQ is a square region having four sides which cross the centers $G_{21}$ and $G_{31}$ of the contact areas of the left and right front wheels 21 and 31, which are rotationally driven, and the longitudinal centerline CL, which passes through the middle point MP and is orthogonal to the axle line $P_1$, at an angle of 45 degrees.

Notably, the other configuration of the fourth embodiment is similar to the first embodiment.

Even with the configuration in which the surveillance camera 60 is disposed within the region of the rectangle SQ centered at the middle point MP on the axle line $P_1$ of the drive wheels (front wheels 21 and 31), the movement range of the surveillance camera 60 falls within the region of the rectangle SQ in either of the case where the surveillance camera 60 descends and the case where the surveillance camera 60 ascends, whereby an image blur during the turn of the mobile vehicle 1D can be suppressed.

It is to be noted that, in the mobile vehicles 1B and 1C in the second and third embodiments, the surveillance camera 60 may be disposed within the region of the rectangle SQ as in the fourth embodiment.

(Fifth Embodiment)

Figure 13:
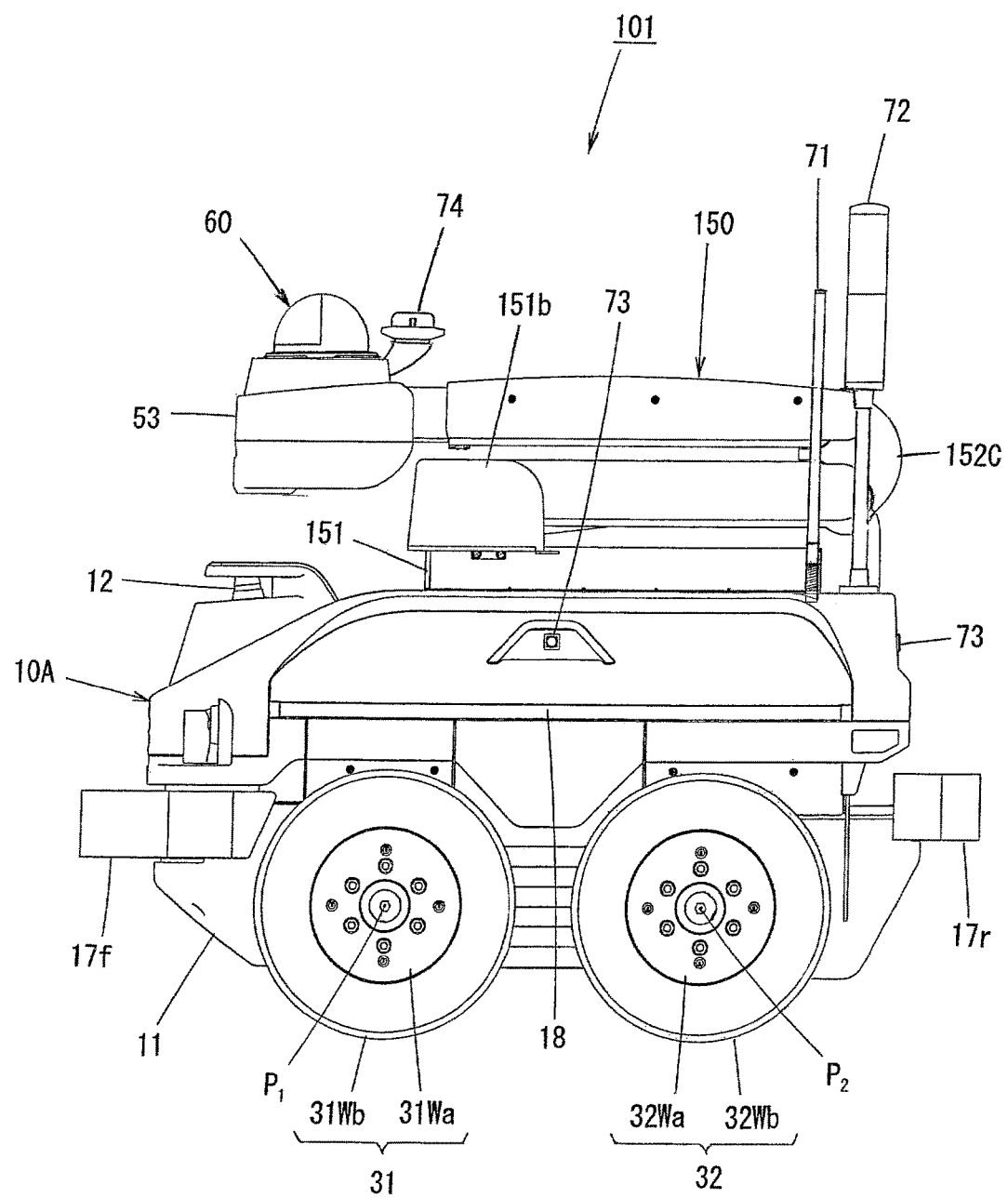
FIG. 13 is a left side view illustrating a mobile vehicle according to a fifth embodiment.
Figure 14:
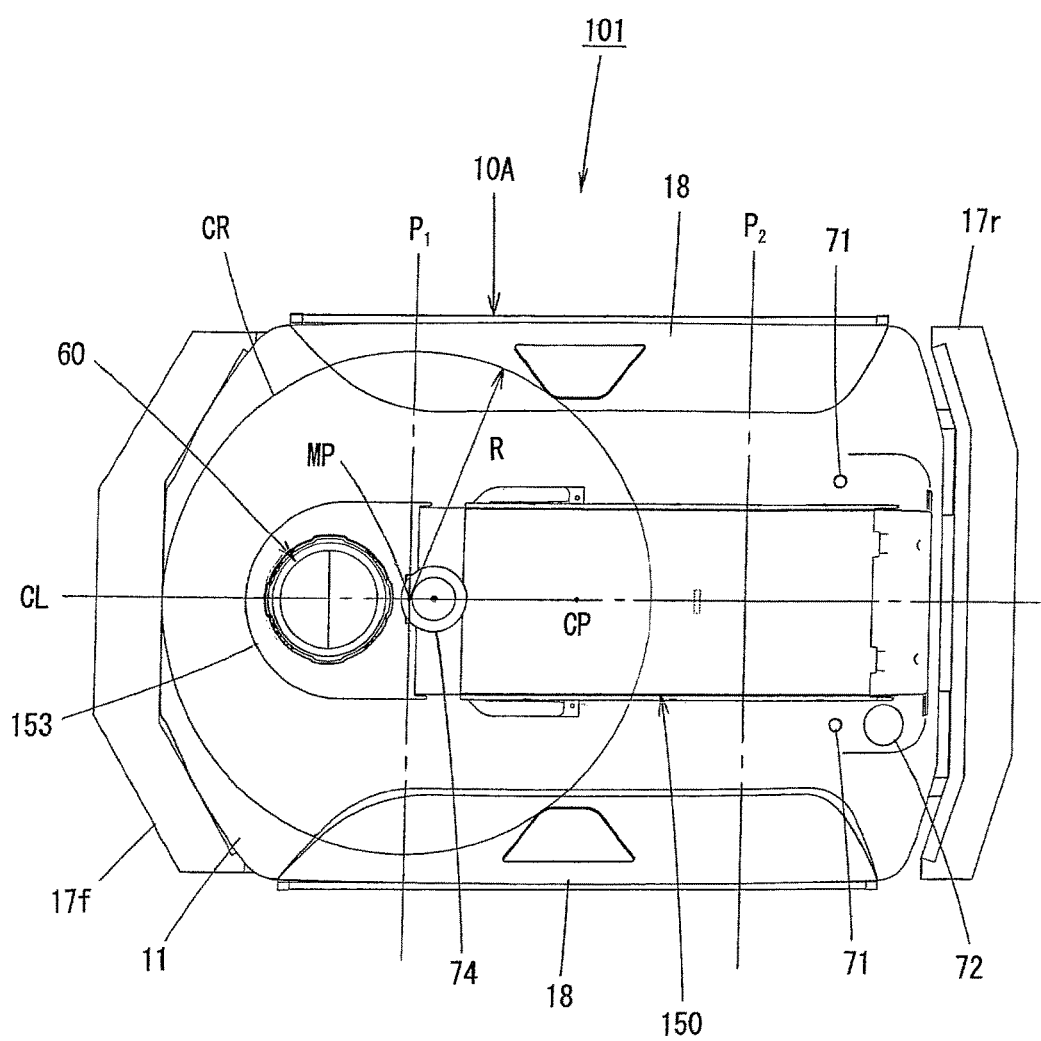
FIG. 14 is a plan view of the mobile vehicle illustrated in FIG. 13 viewed from top.
Figure 15:
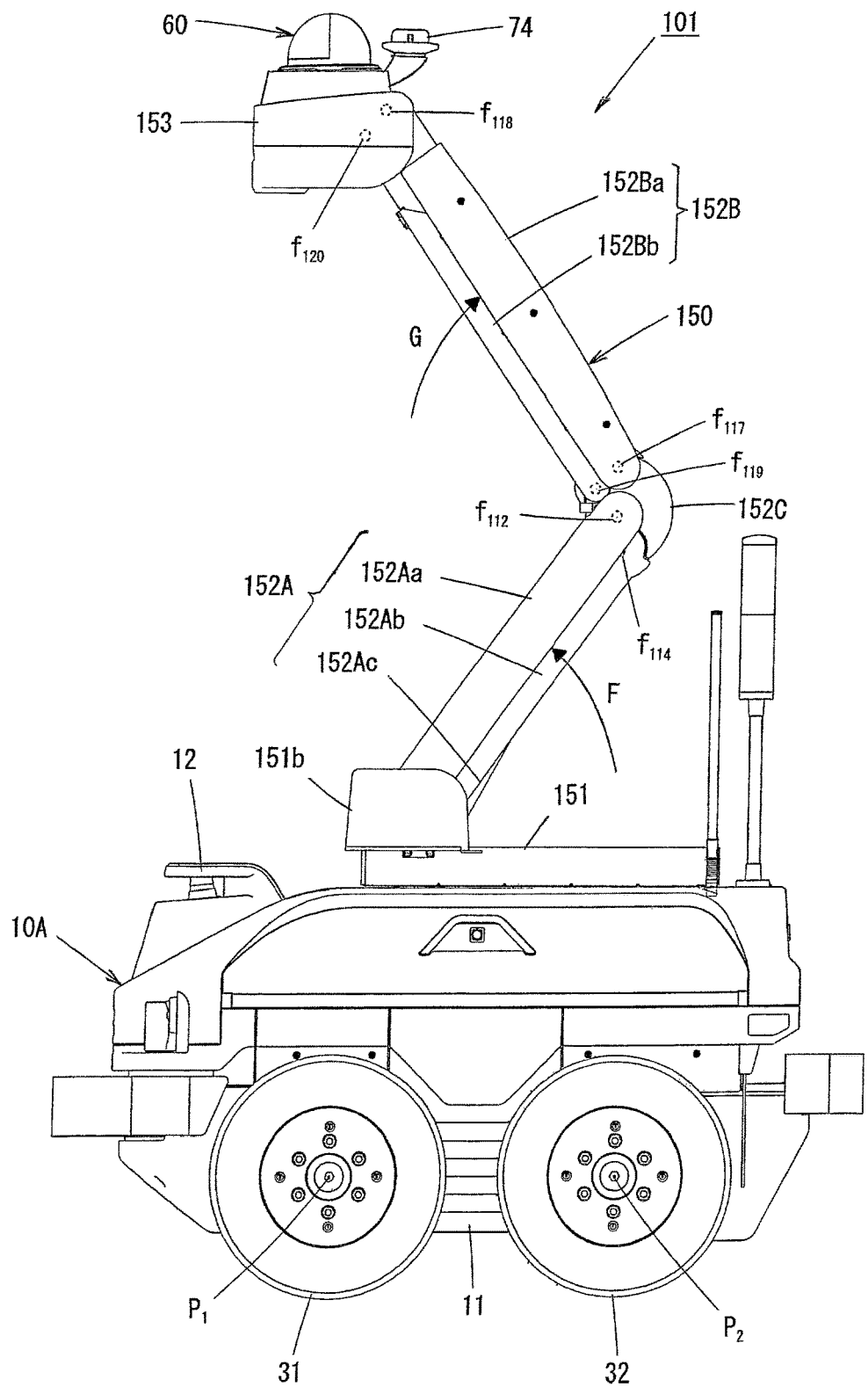
FIG. 15 is a left side view illustrating the state in which an imaging unit of the mobile vehicle ascends according to the fifth embodiment.
Figure 16:
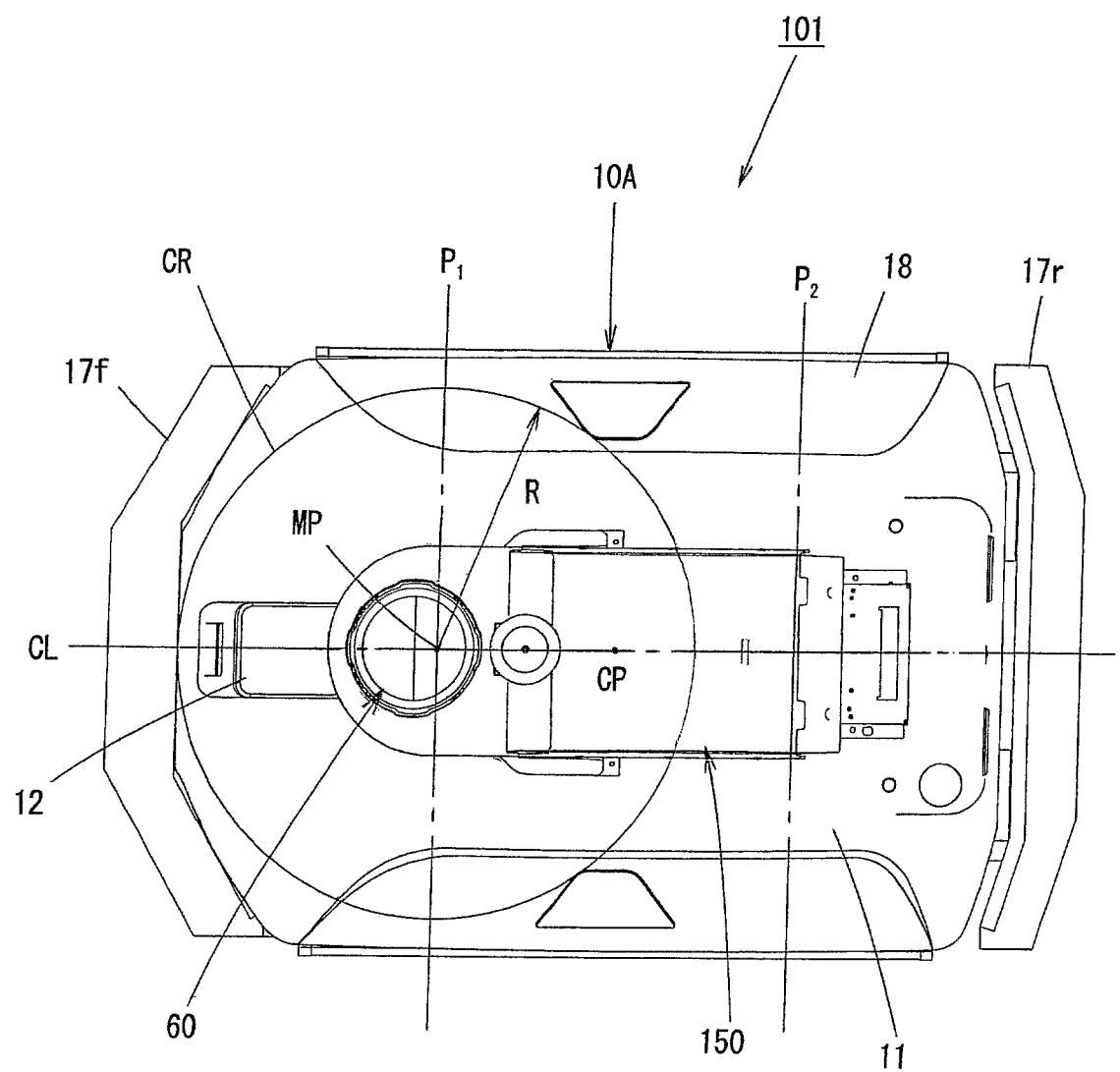
FIG. 16 is a plan view of the mobile vehicle illustrated in FIG. 15 viewed from top.

FIG. 13 is a left side view illustrating a mobile vehicle according to a fifth embodiment, and FIG. 14 is a plan view of the mobile vehicle illustrated in FIG. 13 viewed from top. Further, FIG. 15 is a left side view illustrating the state in which an imaging unit of the mobile vehicle ascends according to the fifth embodiment, and FIG. 16 is a plan view of the mobile vehicle illustrated in FIG. 15 viewed from top. It is to be noted that, in FIGS. 13 to 16, the components same as those in FIGS. 2 to 5 are identified by the same reference numerals.

The mobile vehicle 101 according to the fifth embodiment is different from the first embodiment in the configuration of a lift mechanism unit 150, and the other configuration in the fifth embodiment is substantially the same as the first embodiment.

The different point in the fifth embodiment from the first embodiment will mainly be described below.

As illustrated in FIGS. 13 and 14, a single arm pantograph mechanism is used as the lift mechanism unit 150 in the fifth embodiment.

Specifically, the lift mechanism unit 150 includes an underframe 151 fixed on the undercarriage body 11 to extend in the front-back direction, a first boom 152A that is mounted at the front end of the underframe 151 so as to be swingable around a lateral axis, a second boom 152B that is mounted at the front end of the first boom 152A so as to be swingable around a lateral axis, a hinge unit 152C that connects the first boom 152A and the second boom 152B, a balance unit 153 provided at the leading end of the second boom 152B, and an unillustrated telescopic cylinder that is provided in the underframe 151 to vertically swing the first boom 152A.

The underframe 151 includes a pivot unit 151b that is provided at the rear end to pivotally support the base end of the first boom 152A. The first boom 152A includes a lower first frame 152Aa, a lower second frame 152Ab provided along the lower first frame 152Aa, and a balancing rod 152Ac.

The second boom 152B includes an upper frame 152Ba and a balance unit support rod 152Bb provided along the upper frame 152Ba. The base end of the lower first frame 152Aa is fixed to a lower first base end shaft which is not illustrated and pivotally mounted to the pivot unit 151b so as to be rotatable, and the leading end of the lower first frame 152Aa is pivotally mounted to the hinge unit 152C through a lower first leading end shaft $f_{112}$.

The base end of the lower second frame 152Ab is fixed to a lower second base end shaft which is not illustrated and pivotally mounted to the pivot unit 151b so as to be rotatable, and the leading end of the lower second frame is pivotally mounted to the hinge unit 152C through a lower second leading end shaft $f_{114}$.

The base end of the balancing rod 152Ac is fixed to a lower third base end shaft which is not illustrated and pivotally mounted to the pivot unit 151b so as to be rotatable, and the leading end of the balancing rod 152Ac is pivotally mounted to an unillustrated bent base end of the upper frame 152Ba through an unillustrated lower third leading end shaft.

The base end of the upper frame 152Ba is fixed to an upper first base end shaft $f_{117}$ pivotally mounted to the pivot unit 151b, and the leading end of the upper frame 152Ba is pivotally mounted to the balance unit 153 through an upper first leading end shaft $f_{118}$.

The base end of the balance unit support rod 152Bb is fixed to an upper second base end shaft $f_{119}$ pivotally mounted to the pivot unit 151b, and the leading end of the balance unit support rod 152Bb is pivotally mounted to the balance unit 153 through a second leading end shaft $f_{120}$.

An electric cylinder, a hydraulic cylinder, or a pneumatic cylinder can be used as the unillustrated telescopic cylinder as in the first embodiment.

The base end of the telescopic cylinder is pivotally mounted to the underframe 151 or the undercarriage body 11 so as to be swingable in the vertical direction, and the leading end of the telescopic cylinder is coupled to the lower first base end shaft through an arm not illustrated. In this case, the leading end of the telescopic cylinder is pivotally mounted to one end of the arm, and the other end of the arm is fixed to the lower first base end shaft.

The balance unit 153 is a balancing device that stably keeps normal attitudes of the surveillance camera 60 and the GPS antenna 74, even if the first and second booms 152A and 152B swing in the vertical direction, as in the first embodiment.

Next, the operation of the lift mechanism unit 150 will be described.

FIGS. 13 and 14 illustrate the state in which the lift mechanism unit 150 descends, and at that time, the telescopic cylinder extends. To lift the lift mechanism unit 150, the telescopic cylinder is contracted. According to this, the arm pivotally mounted to the leading end of the telescopic cylinder is pulled forward, and the arm, the lower first base end shaft, and the lower first frame 152Aa integrally swing upward (in the direction of an arrow F) as illustrated in FIGS. 15 and 16. Further, when the lower first frame 152Aa swings upward, the lower second frame 152Ab coupled to the leading end of the lower first frame 152Aa through the hinge unit 152C is lifted up (in the direction of the arrow F).

In this case, the lower second leading end shaft $f_{114}$ of the hinge unit 152C is drawn toward the lower second frame 152Ab due to the parallel positional deviation of the lower second frame 152Ab with respect to the lower first frame 152Aa. Thus, the bent base end of the upper frame 152Ba is drawn toward the balancing rod 152Ac, whereby the upper frame 152Ba swings in the direction of an arrow G and ascends. Simultaneously, the balance unit support rod 152Bb coupled to the leading end of the upper frame 152Ba is lifted up through the balance unit 153.

In this case, the upper second leading end shaft $f_{120}$ of the balance unit 153 is drawn toward the balance unit support rod 152Bb due to the parallel positional deviation of the balance unit support rod 152Bb with respect to the upper frame 152Ba. Thus, the normal attitudes of the balance unit 153, and the surveillance camera 60 and the GPS antenna 74 placed on the balance unit 153 are maintained from the descending position to the ascending position.

When the telescopic cylinder is extended, the first and second booms 152A and 152B perform the operation reverse to the above operation, so that it is in the descending state illustrated in FIG. 13 from the ascending state illustrated in FIG. 15.

As in the first embodiment, the surveillance camera 60 placed on the balance unit 153 of the lift mechanism unit 150 having the above configuration is disposed in a region of a circle CR which has a radius R from the middle point MP on the first axle line $P_1$ of a pair of left and right front wheels 21 and 31 within an inner region of the electric undercarriage 10A in a plan view. In addition, the surveillance camera 60 is disposed on the longitudinal centerline CL orthogonal to the middle point MP on the first axle line $P_1$ in the region of the circle CR. In the second embodiment, the height of the surveillance camera 60 at the descending position is about 900 to 1100 mm, and the height of the surveillance camera 60 at the ascending position is about 1650 to 1900 mm.

The surveillance camera 60 at the descending position illustrated in FIG. 14 is placed anterior to the middle point MP, and the surveillance camera 60 at the ascending position illustrated in FIG. 16 is located almost directly above the middle point MP. In either case, the surveillance camera 60 is within the region of the circle CR. That is, the movement range of the surveillance camera 60, which is lifted and lowered by the lift mechanism unit 150, in a plan view falls within the region of the circle CR. Therefore, the shake of the surveillance camera 60 at the leading end of the second boom 152B is suppressed to prevent an image blur when the surveillance camera 60 which is located at the ascending position photographs the surrounding space while turning, as well as when the surrounding space is photographed by the surveillance camera 60 located at the descending position.

Further, when the front and rear wheels 21 and 22 on the right and the front and rear wheels 31 and 32 on the left are rotated in the opposite directions at the same rotating speed, the mobile vehicle 101 turns while stationary around the middle point MP (stationary turn center point MP) on the first axle line $P_1$. At that time, since the surveillance camera 60 at the ascending position as illustrated in FIG. 16 is located close to the stationary turn center point MP (middle point MP), the shake thereof is suppressed, and thus, an image blur can be suppressed.

Notably, the electric undercarriage 10A of the mobile vehicle 101 according to the fifth embodiment may be configured like the electric undercarriage 10B in the second embodiment or the electric undercarriage 10C in the third embodiment. Further, the surveillance camera 60 on the lift mechanism unit 150 of the mobile vehicle 101 in the fifth embodiment may be disposed in the region of the rectangle SQ as in the fourth embodiment.

(Sixth Embodiment)

Figure 17:
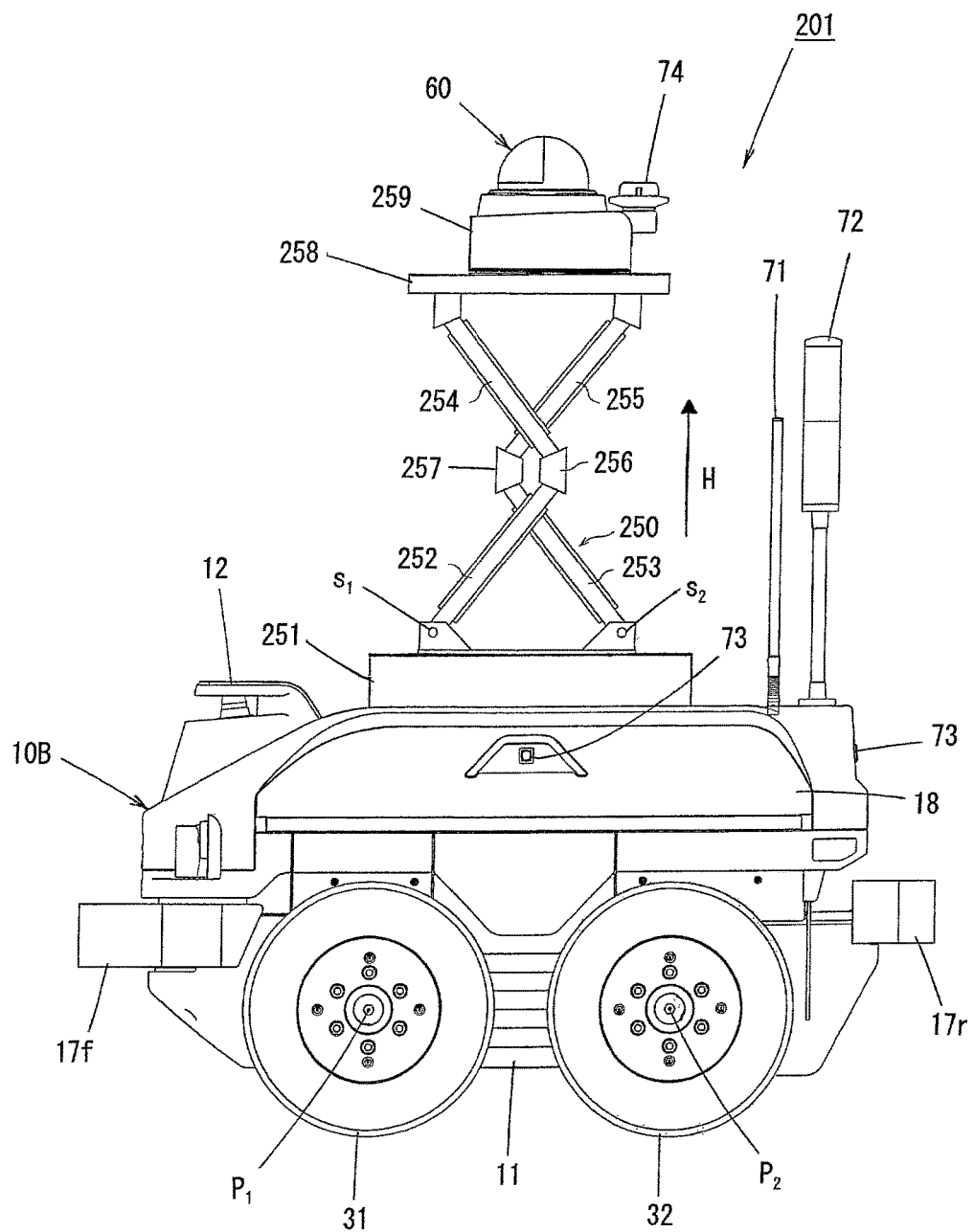
FIG. 17 is a left side view illustrating a mobile vehicle according to a sixth embodiment.

FIG. 17 is a left side view illustrating a mobile vehicle according to a sixth embodiment. It is to be noted that, in FIG. 17, the components same as those in FIGS. 2, 6, and 7 are identified by the same reference numerals.

The mobile vehicle 201 according to the sixth embodiment includes a lift mechanism unit 250 that ascends and descends in the vertical direction on the electric undercarriage 10B in the second embodiment. The other configuration in the sixth embodiment is similar to the second embodiment.

The different point in the sixth embodiment from the second embodiment will mainly be described below.

As illustrated in FIG. 17, a crossed arm pantograph mechanism is used for the lift mechanism unit 250 according to the sixth embodiment.

That is, the lift mechanism unit 250 includes a rectangular underframe 251 fixed on the undercarriage body 11, an outer lower frame 252 fixed to a lateral first shaft $s_1$ that is pivotally mounted on the front end of the underframe 251, an inner lower frame 253 fixed to a lateral second shaft $s_2$ pivotally mounted on the rear end of the underframe 251, an outer upper frame 254 coupled to the leading end of the outer lower frame 252 through a first hinge unit 256, an inner upper frame 255 coupled to the leading end of the inner lower frame 253 through a second hinge unit 257, a lifting base 258 pivotally mounted to the leading end of the outer upper frame 254 and the leading end of the inner upper frame 255, a fixing base 259 for fixing the surveillance camera 60 and the GPS antenna 74 on the lifting base 258, and an unillustrated telescopic cylinder that is provided in the underframe 251 to vertically swing the outer lower frame 252 or the inner lower frame 253.

An electric cylinder, a hydraulic cylinder, or a pneumatic cylinder can be used as the unillustrated telescopic cylinder as in the first embodiment.

The base end of the telescopic cylinder is pivotally mounted to the underframe 251 or the undercarriage body 11 so as to be swingable in the vertical direction, and the leading end of the telescopic cylinder is coupled to the first shaft $S_1$ or the second shaft $s_2$ through an arm not illustrated. In this case, the leading end of the telescopic cylinder is pivotally mounted to one end of the arm, and the other end of the arm is fixed to the first shaft $s_1$ or the second shaft $s_2$.

According to the lift mechanism unit 250 thus configured, when the telescopic cylinder is contracted, the crossed arm pantograph mechanism extends in the perpendicular direction (the direction of an arrow H) to lift up the surveillance camera 60 and the GPS antenna 74, and when the telescopic cylinder is extended, the crossed arm pantograph mechanism is contracted to lower the surveillance camera 60 and the GPS antenna 74.

In the sixth embodiment, the surveillance camera 60 placed on the lift mechanism unit 250 having the above configuration is located directly above the center point CP of the electric undercarriage 10B described with reference to FIG. 6(B), that is, the stationary turn center point of the electric undercarriage 10B. This center point CP is formed within the region of the circle CR which has a radius R from the middle point MP on the first axle line $P_1$ of a pair of left and right front wheels 21 and 31 within an inner region of the electric undercarriage 10B in a plan view.

Notably, in the sixth embodiment, the height of the surveillance camera 60 at the descending position is about 800 to 1100 mm, and the height of the surveillance camera 60 at the ascending position is about 1700 to 2500 mm.

In the mobile vehicle 201 according to the sixth embodiment, when the front and rear wheels 21 and 22 on the right and the front and rear wheels 31 and 32 on the left are rotated in the opposite directions at the same rotating speed, the mobile vehicle 201 turns while stationary around the center point CP. At that time, since the surveillance camera 60 is always located on the rotation center within the movement range from the descending position to the ascending position, the shake thereof and an image blur during the stationary turn can be suppressed.

Further, the surveillance camera 60 is disposed within the region of the circle CR centered at the middle point MP on the first axle line $P_1$. Therefore, even when the front and rear wheels 21 and 22 on the right and the front and rear wheels 31 and 32 on the left turn clockwise or counterclockwise by the difference in the rotating speed, the shake of the surveillance camera 60 and the image blur can also be suppressed.

(Other Embodiments)

In the third embodiment, a caster which can swivel around a vertical axis may be used for the left and right rear wheels 22 and 32.

In the mobile vehicles according to the first to sixth embodiments, the lift mechanism unit may be eliminated, and the surveillance camera 60 may be provided on the undercarriage body 11 directly or through an installation base.

The embodiments of the present invention described above should be considered in all respects as illustrative and not restrictive of the present invention. The scope of the present invention is not limited to the above description, but the accompanying claims and their equivalents are intended to cover such forms or modifications as would fall within the scope and spirit of the invention.

What is claimed is:

1. A mobile vehicle comprising:
an electric undercarriage;
an imaging unit; and
a lift mechanism unit that is provided on the electric undercarriage to move the imaging unit in a cross direction and in a vertical direction perpendicular to the cross direction, wherein
the electric undercarriage includes:
an undercarriage body,
multiple wheels which are provided as two pairs of left and right wheels, one of the two pairs of left and right wheels located on a front part of the undercarriage body and another of the two pairs of left and right wheels located on a rear part thereof,
two electric motors that independently and rotationally drive the pair of left and right wheels on at least one of the front part and the rear part out of the multiple wheels, and
a battery that supplies electric power to the two electric motors,
a first pair of left and right wheels of the two pairs of left and right wheels being axially disposed on a first axle line,
a second pair of left and right wheels of the two pairs of left and right wheels being axially disposed on a second axle line,
the cross direction extends between the first axle line and the second axle line,
when the imaging unit is moved by the lift mechanism unit (1) to a foremost position along the cross direction or (2) to an apex position along the vertical direction, in a plan view, the imaging unit is disposed in a circular region that is centered at a middle point on the first axle line between the pair of left and right wheels and that has a predetermined radius shorter than a distance from the first axle line to the second axle line, and
the foremost position is a furthest position of the imaging unit along the cross direction,
the apex position is a highest point of the imaging unit along the vertical direction.

2. The mobile vehicle according to claim 1, wherein the predetermined radius is set to be equal to or shorter than a distance from the middle point to an outer peripheral edge of the electric undercarriage in a plan view.

3. The mobile vehicle according to claim 1, wherein the imaging unit is disposed in a rectangular region which falls within the circular region and is formed such that corner portions are located on the first axle line and on a longitudinal centerline that passes through the middle point and is orthogonal to the first axle line.

4. The mobile vehicle according to claim 1, wherein the imaging unit is disposed on a longitudinal centerline that passes through the middle point and is orthogonal to the first axle line in a plan view.

5. The mobile vehicle according to claim 1, wherein
the pair of left and right wheels rotationally driven by the electric motors are front wheels located on the first axle line, and
the imaging unit is moveable anterior to the middle point on the first axle line.

6. The mobile vehicle according to claim 1, wherein
the lift mechanism unit is a link mechanism including an underframe fixed on the undercarriage body to extend in the front-back direction, and a boom provided at a rear end of the underframe so as to be swingable around a lateral axis, the underframe has a support unit that is provided on a front end of the underframe to support the boom, and the support unit is disposed on the first axle line.

7. The mobile vehicle according to claim 1, wherein each of the pair of left and right wheels rotationally driven by the two electric motors includes a wheel body mounted to the electric undercarriage through a drive shaft and a tire mounted on an outer periphery of the wheel body and filled with air.

8. The mobile vehicle according to claim 1, wherein the mobile vehicle is an autonomous mobile vehicle.

* * * * *